(12) United States Patent
Chu et al.

(10) Patent No.: US 11,588,603 B2
(45) Date of Patent: *Feb. 21, 2023

(54) ALLOCATING RESOURCE UNITS FOR UPLINK MULTI-USER TRANSMISSIONS IN WIDE BANDWIDTHS

(71) Applicant: Marvell Asia Pte, Ltd., Singapore (SG)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 49 days.

This patent is subject to a terminal disclaimer.

(21) Appl. No.: 16/847,326

(22) Filed: Apr. 13, 2020

(65) Prior Publication Data

US 2020/0304266 A1 Sep. 24, 2020

Related U.S. Application Data

(63) Continuation-in-part of application No. 16/827,495, filed on Mar. 23, 2020.
(Continued)

(51) Int. Cl.
*H04L 12/28* (2006.01)
*H04L 5/00* (2006.01)
(Continued)

(52) U.S. Cl.
CPC ......... *H04L 5/0053* (2013.01); *H04B 7/0452* (2013.01); *H04L 5/0007* (2013.01);
(Continued)

(58) Field of Classification Search
CPC ..... H04L 5/0007; H04L 5/001; H04L 5/0094; H04L 5/0041; H04W 28/20; H04W 72/0453; H04W 84/12; H04B 7/0452
(Continued)

(56) References Cited

U.S. PATENT DOCUMENTS 11,115,104 B2 * 9/2021 Huang ................ H04B 17/309
2010/0315949 A1 * 12/2010 Agarwal ................ H04B 7/22
370/252

(Continued)

OTHER PUBLICATIONS

Wu et al., "Follow up discussions on Throughput Enhancement," IEEE Draft, Samsung, doc.: IEEE 802.11-17/1184r1, 17 pages (Jul. 9, 2018).
(Continued)

*Primary Examiner* — John Pezzlo

(57) ABSTRACT

A communication device operates according to a communication protocol defines a first set of frequency resource units (RUs) and a second set of frequency RUs. The first set of frequency RUs includes at least a first subset of frequency RUs having a first bandwidth and a second set of RUs having a second bandwidth greater than the first bandwidth, and the second set of frequency RUs omits at least some of the frequency RUs in the first subset of frequency RUs. The communication device determines that a communication channel to be used for an uplink (UL) multi-user (MU) transmission spans a frequency bandwidth greater than 160 MHz, and allocates one or more frequency RUs for the UL MU transmission, including: in response to determining that the communication channel spans the frequency bandwidth greater than 160 MHz, selecting one or more frequency RUs from a second set of frequency RUs.

20 Claims, 11 Drawing Sheets

Related U.S. Application Data

(60) Provisional application No. 62/832,741, filed on Apr. 11, 2019, provisional application No. 62/821,933, filed on Mar. 21, 2019.

(51) Int. Cl.

| | |
|---|---|
| *H04W 72/0453* | (2023.01) |
| *H04W 72/04* | (2023.01) |
| *H04W 72/0446* | (2023.01) |
| *H04B 7/0452* | (2017.01) |
| *H04J 1/16* | (2006.01) |

(52) U.S. Cl.
CPC .......... *H04L 5/0037* (2013.01); *H04L 5/0094* (2013.01); *H04W 72/0413* (2013.01); *H04W 72/0446* (2013.01); *H04W 72/0453* (2013.01)

(58) Field of Classification Search
USPC ........................................ 370/252, 329, 430
See application file for complete search history.

(56) References Cited

U.S. PATENT DOCUMENTS

| | | |
|---|---|---|
| 2011/0255620 A1 | 10/2011 | Jones, IV et al. |
| 2015/0131517 A1 | 5/2015 | Chu et al. |
| 2017/0013604 A1 | 1/2017 | Vermani et al. |
| 2017/0265240 A1* | 9/2017 | Chen ............... H04L 5/0048 |
| 2019/0045461 A1 | 2/2019 | Fang et al. |
| 2019/0123863 A1 | 4/2019 | Zhang et al. |
| 2019/0253296 A1 | 8/2019 | Chen et al. |
| 2019/0327746 A1* | 10/2019 | Porat ............... H04L 5/0041 |
| 2019/0373586 A1* | 12/2019 | Verma ............... H04B 7/0697 |
| 2020/0153491 A1 | 5/2020 | Yang et al. |
| 2020/0178299 A1* | 6/2020 | Yang ............... H04W 74/0808 |
| 2020/0413396 A1 | 12/2020 | Yu et al. |
| 2021/0021322 A1* | 1/2021 | Kuo ............... H04L 5/0051 |
| 2021/0176643 A1 | 6/2021 | Jang et al. |
| 2021/0176785 A1 | 6/2021 | Jang et al. |
| 2021/0250125 A1 | 8/2021 | Park et al. |

OTHER PUBLICATIONS

International Search Report and Written Opinion in International Patent Application No. PCT/US2020/027983, dated Jul. 3, 2020 (15 pages).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

Kwon et al., "SIG Field Design Principle for 11ax," Newracon, doc. IEEE 802.11-15/0344r2, Mar. 2015, 18 pages.

Wang, "IEEE P802.11, Wireless LANs, Specification Framework for TGaz," Revision 1.1, *Institute of Electrical and Electronics Engineers*, doc. IEEE 802.11-17/0462r4, May 11, 2017, 15 pages.

Zhang et al., "EHT Technology Candidate Discussions," doc: IEEE 802.11-18/1161r0, *The Institute of Electrical and Electronics Engineers, Inc.*, pp. 1-10 Jul. 8, 2018.

U.S. Appl. No. 16/827,495, Chu et al., "Allocating Resource Units for Multi-User Transmissions in Wide Bandwidths," filed Mar. 23, 2020.

Non-Final Office Action of U.S. Appl. No. 16/827,495 dated Oct. 8, 2021 (10 pages).

Notice of Allowance in U.S. Appl. No. 16/827,495, dated Feb. 11, 2022.

Notice of Allowance in U.S. Appl. No. 16/827,495, dated Jun. 2, 2022.

* cited by examiner

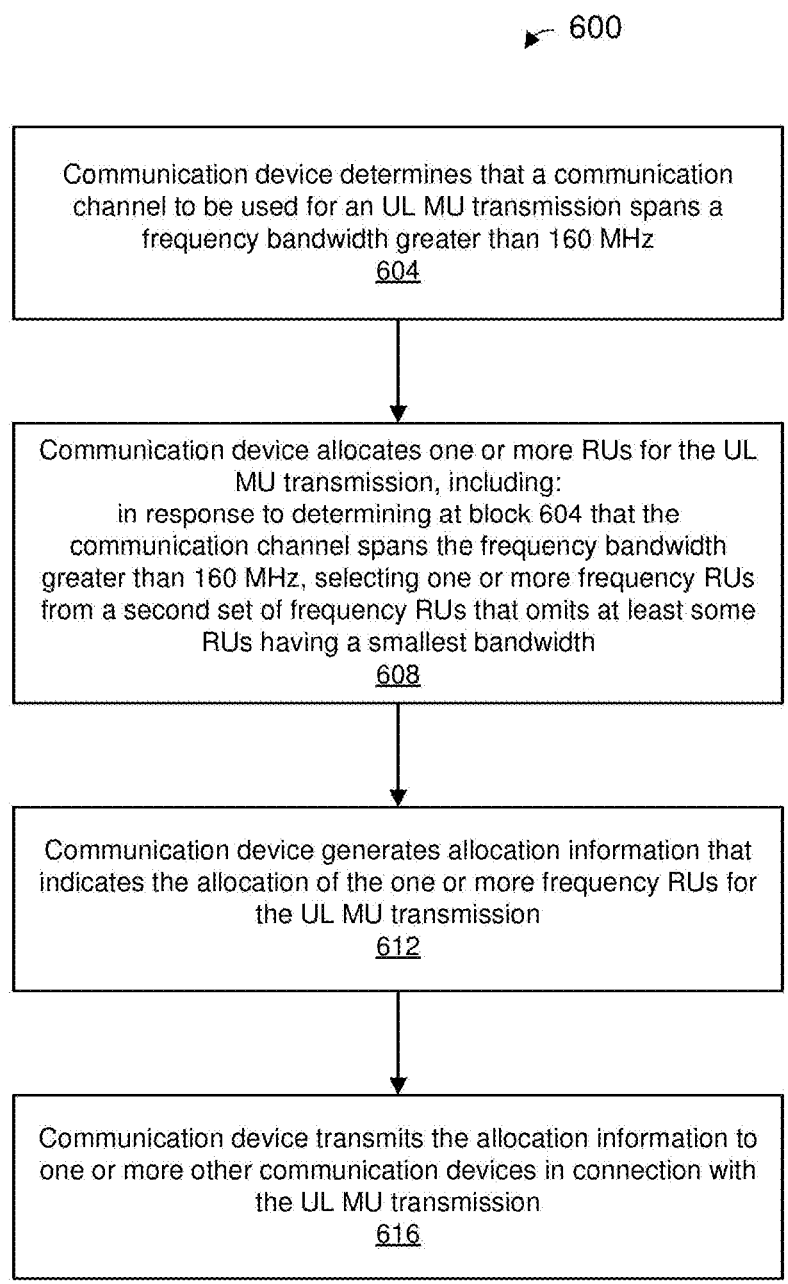

ALLOCATING RESOURCE UNITS FOR UPLINK MULTI-USER TRANSMISSIONS IN WIDE BANDWIDTHS

CROSS REFERENCES TO RELATED APPLICATIONS

This application claims the benefit of U.S. Provisional Patent Application No. 62/832,741, entitled "Resource Unit (RU) Indication for Uplink (UL) Multi-User (MU) Operation," filed on Apr. 11, 2019, which is incorporated herein by reference in its entirety.

Additionally, this application is a continuation-in-part of U.S. patent application Ser. No. 16/827,495, entitled "Allocating Resource Units for Multi-User Transmissions in Wide Bandwidths," filed on Mar. 23, 2020, which claims the benefit of U.S. Provisional Patent Application No. 62/821,933, entitled "Resource Unit (RU) Indication for Downlink (DL) Multi-User (MU) Operation," filed on Mar. 21, 2019. All of the applications referenced above are incorporated herein by reference in their entireties.

FIELD OF TECHNOLOGY

The present disclosure relates generally to wireless communication systems, and more particularly to allocating frequency resource units (RUs) in a wireless local area network.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up to 160 MHz aggregate communication channels. Work has now begun on a new iteration of the IEEE 802.11 Standard, which is referred to as the IEEE 802.11be Standard, or Extremely High Throughput (EHT) WLAN. The IEEE 802.11be Standard may permit aggregation of as many as sixteen 20 MHz sub-channels (or perhaps even more) to form up to 320 MHz aggregate communication channels (or perhaps even wider aggregate communication channels).

The current draft of the IEEE 802.11ax Standard (referred to herein as "the IEEE 802.11ax Standard" for simplicity) permits uplink (UL) multi-user (MU) transmissions in which multiple client stations simultaneously transmit independent data streams to an access point in different frequency segments (sometimes referred to as frequency resource units (RUs)) of a communication channel Additionally, the IEEE 802.11ax Standard defines an RU hierarchy comprising a plurality of levels of different RU bandwidths. For example, the 802.11ax Standard defines 26-tone RUs (having a frequency bandwidth of approximately 2.2 MHz), 52-tone RUs (having a frequency bandwidth of approximately 4.4 MHz), 106-tone RUs (having a frequency bandwidth of approximately 8.8 MHz), 242-tone RUs (having a frequency bandwidth of approximately 20 MHz), 484-tone RUs (having a frequency bandwidth of approximately 40 MHz), and 996-tone RUs (having a frequency bandwidth of approximately 80 MHz). The number of "tones" in each RU refers to a number of orthogonal frequency division multiplexing (OFDM) subcarriers or "tones" in the RU.

To prompt an UL MU transmission, the AP transmits a trigger frame that includes allocation information that indicates, for each client station that is to transmit during the UL MU transmission, the RU in which the client station is to transmit. Upon receiving the trigger frame, a client station analyzes allocation information in the trigger frame that corresponds to the client station to determine the RU for the client station. Then, in response to the trigger frame, the client station transmits in the determined RU as part of the UL MU transmission.

SUMMARY

In an embodiment, a method is for allocating frequency resources for an uplink (UL) multi-user (MU) communication in a wireless local area network (WLAN). The method is used in conjunction with a communication protocol defines a first set of frequency resource units (RUs) of different bandwidths for use with communication channels spanning at most 160 MHz and a second set of frequency RUs for use with communication channels spanning more than 160 MHz. The first set of frequency RUs includes at least a first subset of frequency RUs having a first bandwidth and a second set of RUs having a second bandwidth greater than the first bandwidth, and the second set of frequency RUs omits at least some of the frequency RUs in the first subset of frequency RUs of the first set of frequency RUs. The method includes: determining, at a communication device, that a communication channel to be used for an UL MU transmission spans a frequency bandwidth greater than 160 MHz; allocating, at the communication device, one or more frequency RUs for the UL MU transmission, including: in response to determining that the communication channel spans the frequency bandwidth greater than 160 MHz, selecting one or more frequency RUs from the second set of frequency RUs. The method further comprises: generating, at the communication device, allocation information that indicates the allocation of the one or more frequency RUs for the UL MU transmission; and transmitting, by the communication device, the allocation information to one or more other communication devices in connection with the UL MU transmission.

In another embodiment, a communication device is configured to operate according to a communication protocol that defines a first set of frequency RUs of different bandwidths for use with communication channels spanning at most 160 MHz and a second set of frequency RUs for use with communication channels spanning more than 160 MHz. The first set of frequency RUs includes at least a first subset of frequency RUs having a first bandwidth and a second set of RUs having a second bandwidth greater than the first bandwidth, and the second set of frequency RUs omits at least some of the frequency RUs in the first subset of frequency RUs of the first set of frequency RUs. The communication device comprises: a wireless network interface device having one or more integrated circuit (IC) devices. The one or more IC devices are configured to: determine that a communication channel to be used for an uplink (UL) multi-user (MU) transmission spans an overall frequency bandwidth greater than 160 MHz; and allocate one or more frequency RUs for the UL MU transmission, including: in response to determining that the communication channel spans the frequency bandwidth greater than 160

MHz, selecting one or more frequency RUs from the second set of frequency RUs. The one or more IC devices are further configured to: generate allocation information that indicates the allocation of the one or more frequency RUs for the UL MU transmission; and transmit the allocation information to one or more other communication devices in connection with the UL MU transmission.

BRIEF DESCRIPTION OF THE DRAWINGS

FIG. 6 is a flow diagram of an example method for allocating frequency resources for an UL MU communication in a WLAN, according to an embodiment.

DETAILED DESCRIPTION

A next generation wireless local area network (WLAN) protocol (e.g., the IEEE 802.11be Standard, sometimes referred to as the Extremely High Throughput (EHT) WLAN Standard) may permit aggregation of as many as sixteen 20 MHz sub-channels (or perhaps even more) to form 320 MHz aggregate communication channels (or perhaps even wider aggregate communication channels). For uplink (UL) multi-user (MU) communications in which different frequency resource units (RUs) are allocated to different communication devices, allocation information must be communicated to the communication devices. For a communication channel that spans more than 160 MHz, the number of different possible allocations of RUs is relatively large, and thus a relatively large number of bits may be required to represent RU allocations for an UL MU transmission. Large numbers of bits used for RU allocation information reduces channel efficiency because channel time is required to transmit the RU allocation information and thus cannot be used for transmission of user data.

To improve channel efficiency for wide communication channels (e.g., communication channels that span more than 160 MHz), some frequency RUs (e.g., at least some frequency RUs of a smallest bandwidth) are not permitted to be used for an UL MU transmission, according to some embodiments, which helps to reduce a number of bits required to specify allocations of frequency RUs for the UL MU transmission. Additionally, example techniques for encoding allocation information for allocation of RUs in a wide communication channel (e.g., a communication channel that spans more than 160 MHz), according to various embodiments, are described herein.

Figure 1:
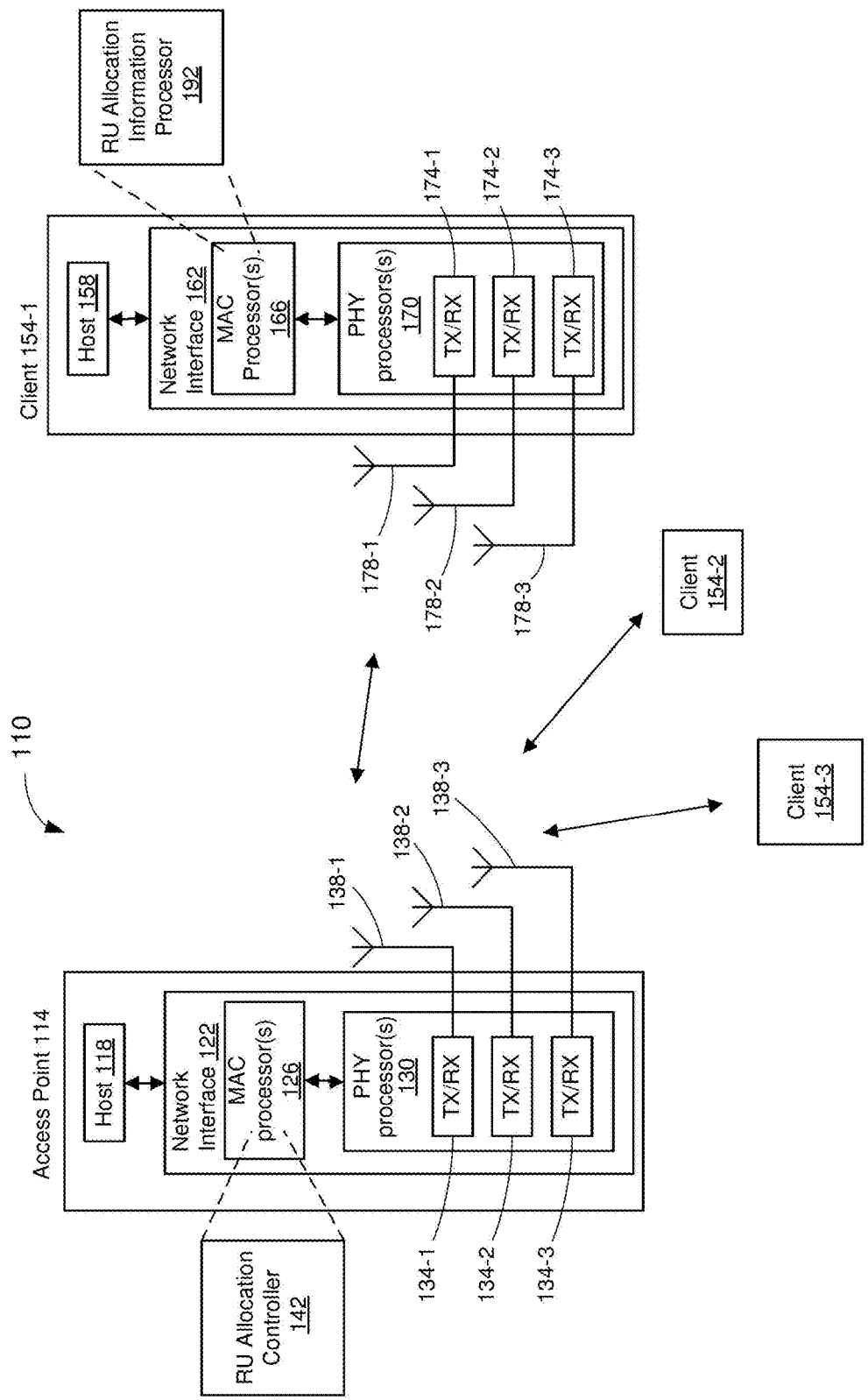
FIG. 1 is a block diagram of an example communication system in which an access point (AP) allocates frequency resource units (RUs) for uplink (UL) multi-user (MU) communications in channels having bandwidths greater than 160 MHz, according to an embodiment.

FIG. 1 is a diagram of an example WLAN 110 that uses communication channels wider than 160 MHz, according to an embodiment. The WLAN 110 includes an AP 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In an embodiment, the wireless network interface device 122 is configured to transmit and receive via a communication channel that spans a bandwidth greater than 160 MHz, the communication channel within a single RF band. In another embodiment, the wireless network interface device 122 is additionally configured for operation within two or more RF bands at the same time or at different times. For example, in an embodiment, the wireless network interface device 122 includes multiple PHY processors 130, where respective PHY processors 130 correspond to respective RF bands. In another embodiment, the wireless network interface device 122 includes a single PHY processor 130, where each transceiver 134 includes respective RF radios corresponding to respective RF bands. In an embodiment, the wireless network interface device 122 is configured to transmit and receive via a communication channel that spans a bandwidth greater than 160 MHz, the communication channel spanning multiple RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and to encapsulate the MAC layer data units to generate PHY data units such as PHY protocol data units (PPDUs) for transmission via the antennas 138. Similarly, the PHY processor 130 may be configured to receive PHY data units that were received via the antennas 138, and to extract MAC layer data units encapsulated within the PHY data units. The PHY processor 130 may provide the extracted MAC layer data units to the MAC processor 126, which processes the MAC layer data units. PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., in various embodiments.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In other embodiments, the MAC processor 126 additionally or alternatively includes one or more hardware state machines.

The MAC processor 126 includes, or implements, an RU allocation controller 142. The RU allocation controller 142 determines an allocation of RUs within a communication channel for multi-user (MU) communications, such as for a downlink an uplink (UL) MU transmission by multiple client stations to the AP 114. In some embodiments, the RU allocation controller 142 generates RU allocation information to be included in a trigger frame configured to prompt an UL MU transmission by multiple client stations.

In an embodiment, the RU allocation controller 142 is implemented by a processor executing machine readable instructions stored in a memory, where the machine readable instructions cause the processor to perform acts described in more detail below. In another embodiment, the RU allocation controller 142 additionally or alternatively comprises one or more hardware state machines that are configured to perform acts described in more detail below.

The WLAN 110 also includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The MAC processor 166 includes, or implements, an RU allocation information processor 192. The RU allocation information processor 192 processes allocation information received from the AP 114 (e.g., within a trigger frame) to determine an RU within a communication channel that the client station 154-1 is to use when transmitting as part of an UL MU transmission by multiple client stations.

In an embodiment, the RU allocation information processor 192 is implemented by a processor executing machine readable instructions stored in a memory, where the machine readable instructions cause the processor to perform acts described in more detail below. In another embodiment, the RU allocation information processor 192 additionally or alternatively comprises one or more hardware state machines that are configured to perform acts described in more detail below.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
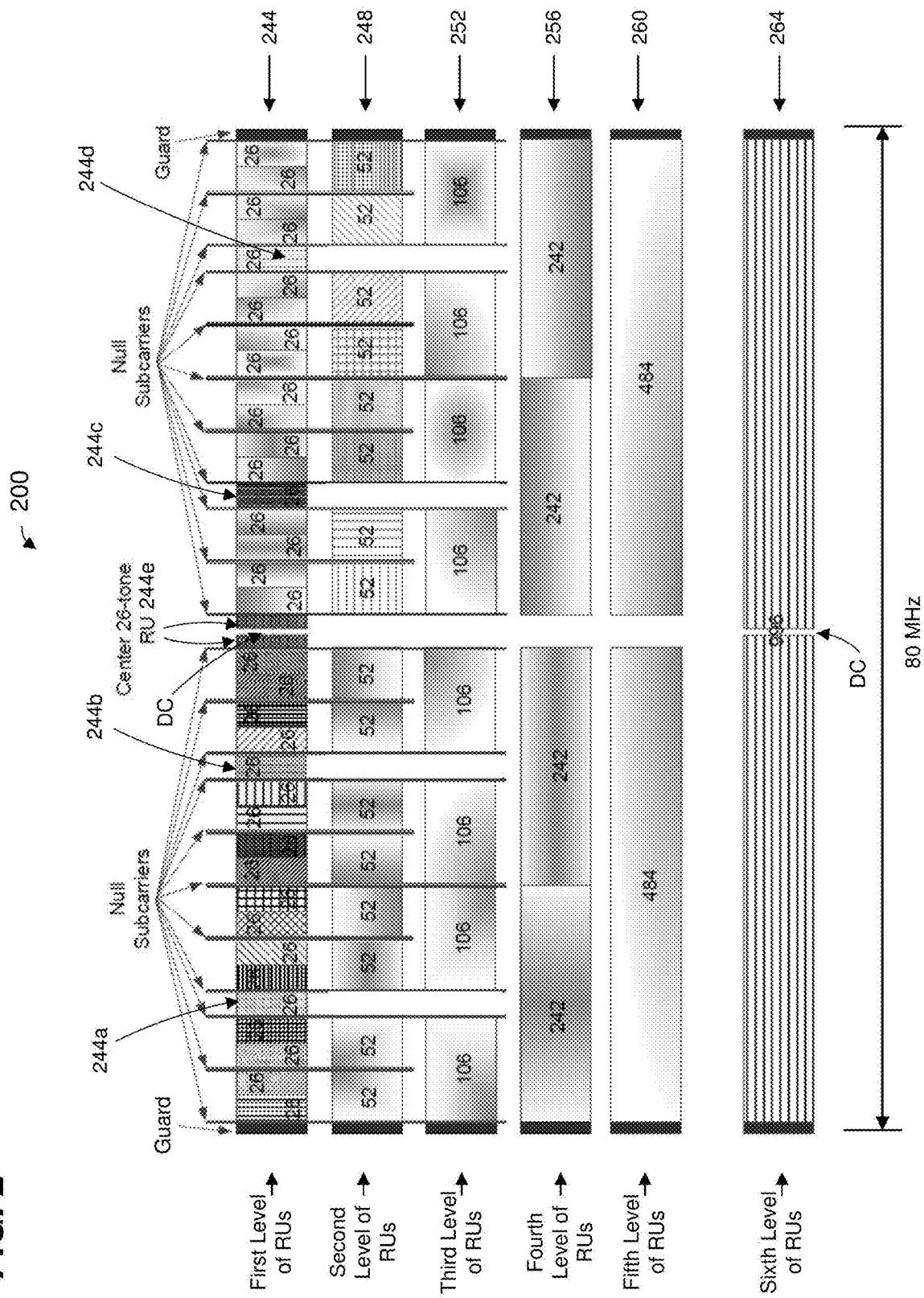
FIG. 2 is a diagram of an example set of frequency RUs, within an 80 MHz segment, that can be allocated for an UL MU transmission in a communication channel having a bandwidth of no more than 160 MHz, according to an embodiment.

FIG. 2 is a diagram of an example set 200 of frequency RUs (sometimes referred to herein as "RUs" for brevity) within an 80 MHz spectrum segment that can be allocated for an UL MU transmission in a communication channel having a bandwidth no more than 160 MHz, according to an embodiment. The set 200 of RUs corresponds to a hierarchy of RUs corresponding to different bandwidths. In an embodiment, the AP 114 (FIG. 1) is configured to (e.g., the network interface device 122 is configured to, the MAC processor 126 is configured to, the RU allocation processor 142 is configured to, etc.) use the set 200 when selecting RUs for an UL MU transmission. For example, the RU allocation controller 142 is configured to select RUs from the set 200 when allocating RUs in the 80 MHz spectrum segment for an UL MU transmission in a communication channel that spans at most 160 MHz.

The set 200 (corresponding to a hierarchy) includes a plurality of levels of RUs including: a first level of RUs 244 (referred to as 26-tone RUs), a second level of RUs 248 (referred to as 52-tone RUs), a third level of RUs 252 (referred to as 106-tone RUs), a fourth level of RUs 256 (referred to as 242-tone RUs), a fifth level of RUs 260 (referred to as 484-tone RUs), and a sixth level of RUs 264 (referred to as 996-tone RUs). The number of "tones" in each RU refers to a number of orthogonal frequency division multiplexing (OFDM) subcarriers or "tones" in the RU. The 26-tone RUs 244 correspond to a bandwidth of approximately 2.2 MHz. The 52-tone RUs 248 correspond to a bandwidth of approximately 4.4 MHz. The 106-tone RUs 252 correspond to a bandwidth of approximately 8.8 MHz. The 242-tone RUs 256 correspond to a bandwidth of approximately 20 MHz. The 484-tone RUs 260 correspond to a bandwidth of approximately 40 MHz. The 996-tone RU 264 corresponds to a bandwidth of approximately 80 MHz. In other embodiments, a set with RUs of different bandwidths and/or numbers of tones are utilized.

In the example set 200, each of the second through sixth levels includes one or more RUs having a frequency bandwidth that is greater than a frequency bandwidth of each RU in the level below. For example, each RU 248 in the second level has a frequency bandwidth approximately double a frequency bandwidth of each RU 244 in the first level. Additionally, each RU in each of the second through sixth levels covers (or overlaps with) a plurality of RUs in the level below. For example, each RU 248 in the second level covers (or overlaps with) a corresponding pair of RUs 244 in the first level.

The first level includes a first set of RUs 244 that are covered by RUs 248 in the second level, and a second set of RUs 244 that are not covered by any RUs 248 in the second level. For example, RUs 244a, 244b, 244c, 244d, and 244e are not by any RUs 248 in the second level. In an embodiment, the RU 244e comprises two portions separated in frequency by a plurality of direct current (DC) tones.

When allocating RUs for a communication channel that spans 80 MHz, the RU allocation controller 142 selects RUs from the portion of the set 200 illustrated in FIG. 2, according to an embodiment. When allocating RUs for a communication channel that spans 160 MHz, and when the RUs to be allocated are at most 80 MHz-wide, the RU controller 142 selects RUs for a first 80 MHz segment of the portion of the set 200 illustrated in FIG. 2, and selects RUs for a second 80 MHz segment of the communication channel from the portion of the set 200 illustrated in FIG. 2, according to an embodiment. In some embodiments, when the communication channel spans 160 MHz, the RU controller 142 optionally may select an RU (not shown) that corresponds to a bandwidth of approximately 160 MHz. The RU (not shown) that corresponds to the bandwidth of approximately 160 MHz is a 996×2-tone RU, and corresponds to a seventh level in the hierarchy of RUs corresponding to FIG. 2, according to an embodiment.

Figure 3A:
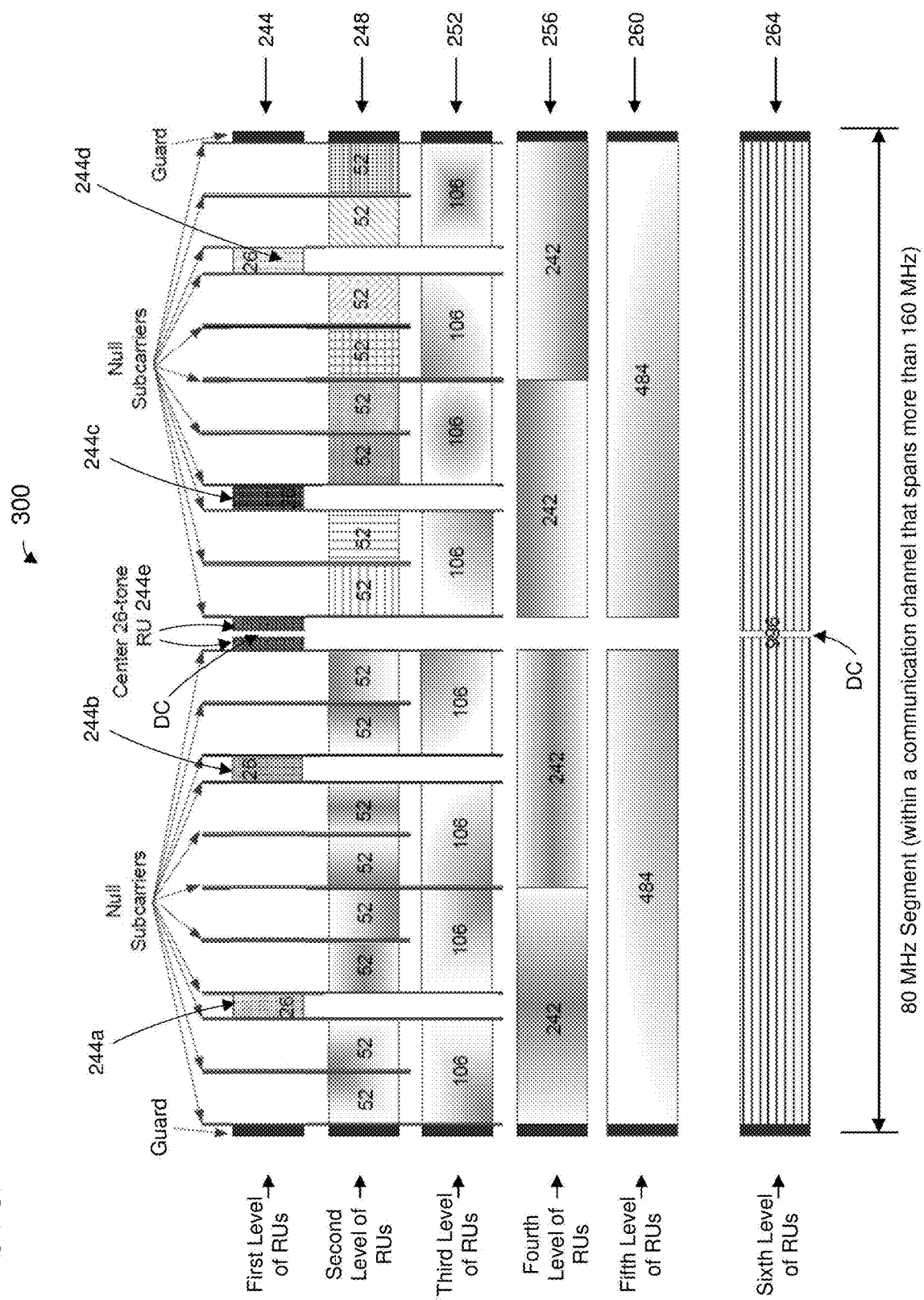
FIG. 3A is a diagram of an example set of frequency RUs, within an 80 MHz segment, that can be allocated for an UL MU transmission in a communication channel that spans more than 160 MHz, according to an embodiment.

FIG. 3A is a diagram of an example set 300 of RUs within an 80 MHz spectrum segment that can be allocated for an UL MU transmission in a communication channel having a bandwidth greater than 160 MHz, according to an embodiment. The set 300 of RUs corresponds to a hierarchy of RUs corresponding to different bandwidths. In an embodiment, the AP 114 (FIG. 1) is configured to (e.g., the network interface device 122 is configured to, the MAC processor 126 is configured to, the RU allocation processor 142 is configured to, etc.) use the set 300 when selecting RUs for an UL MU transmission within an 80 MHz spectrum segment in a communication channel that spans more than 160 MHz. For example, the RU allocation controller 142 is configured to select RUs from the set 300 when allocating RUs for an MU transmission in a communication channel that spans more than 160 MHz, according to an embodiment. For instance, the RU controller 142 selects, for RUs within a particular 80 MHz segment of the communication channel, RUs from the set 300, according to an embodiment.

The set 300 is similar to the set 200 of FIG. 2, and like-numbered elements are not described in detail for purposes of brevity. As compared to the set 200, the set 300 does not include RUs 244 that are covered by RUs 248 in the second level. In other words, any RUs 244 that are covered by any RUs 248 cannot be allocated for an MU transmission in a communication channel that spans more than 160 MHz.

The first level in the hierarchy 350 includes significantly fewer RUs 244 as compared to the first level in the hierarchy 200. Although the example set 350 includes five 26-tone RUs (e.g., RUs 244a, 244b, 244c, 244d, and 244e), other example hierarchies include other suitable numbers of 26-tone RUs that are not covered by a 52-tone RUs, in other embodiments. For example, another example set includes only one 26-tone RU in each of two 40 MHz segments in the hierarch, according to an example embodiment. For example, one example set includes only the 26-tone RU 244a and the 26-tone RU 244c, according to an embodiment. As another example, another example set includes only the 26-tone RU 244b and the 26-tone RU 244d, according to an embodiment.

Figure 3B:
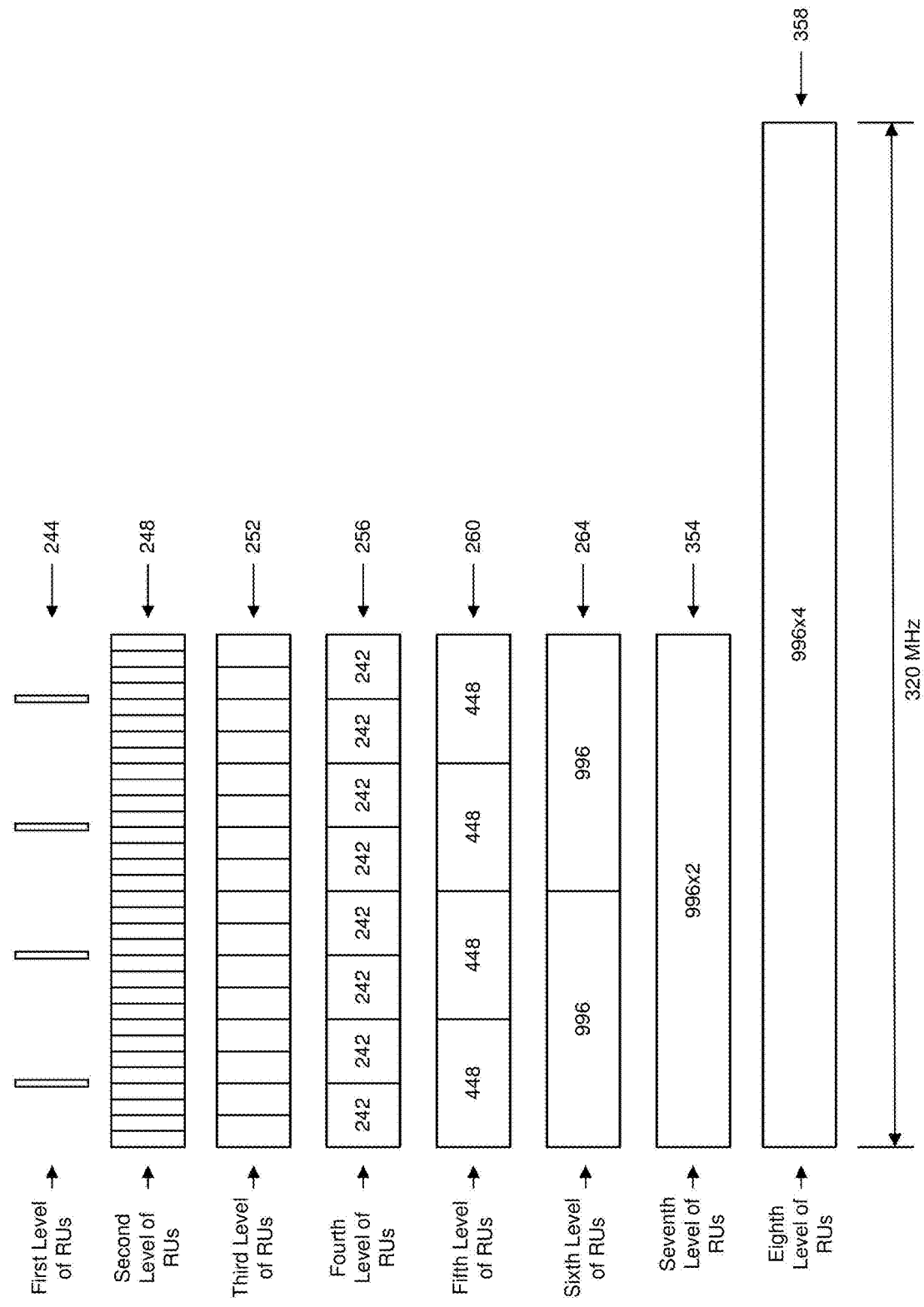
FIG. 3B is a diagram of another example set of frequency RUs that can be allocated for an UL MU transmission in a communication channel that spans more than 160 MHz, according to an embodiment.

FIG. 3B is a diagram of an example set 350 of RUs that can be allocated for an UL MU transmission in a communication channel having a bandwidth greater than 160 MHz, according to an embodiment. The set 350 of RUs corresponds to the hierarchy of RUs of FIG. 3A, but also illustrates seventh and eighth levels of RUs corresponding to bandwidths of 160 MHz and 320 MHz, respectively. In an embodiment, the AP 114 (FIG. 1) is configured to (e.g., the network interface device 122 is configured to, the MAC processor 126 is configured to, the RU allocation processor 142 is configured to, etc.) use the set 350 when selecting RUs for an UL MU transmission in a communication channel that spans more than 160 MHz. For example, the RU allocation controller 142 is configured to select RUs from the set 350 when allocating RUs for an MU transmission in a communication channel that spans more than 160 MHz, according to an embodiment.

FIG. 3B illustrates RUs in the first through seventh levels in only one 160 MHz spectrum segment. Similar RUs for the first through seventh levels are included in another 160 MHz spectrum segment but are not shown in FIG. 3B for clarity.

The set 350 includes a 996×2-tone RU 354 corresponding to a bandwidth of approximately 160 MHz. The set 350 also includes a 996×4-tone RU 358 corresponding to a bandwidth of approximately 320 MHz. In another embodiment, the set 350 does not include the 996×4-tone RU 358. In various embodiments, the set 350 additionally includes one of, or any suitable combination of two or more of: a 996×2+242-tone RU (not shown) corresponding to a bandwidth of approximately 160+20 MHz, a 996×2+484-tone RU (not shown) corresponding to a bandwidth of approximately 160+40 MHz, and a 996×2+996-tone RU (not shown) corresponding to a bandwidth of approximately 160+80 MHz.

The first level in the hierarchy 350 includes significantly fewer RUs 244 as compared to the first level in the hierarchy 200. As a result, a number of bits required to indicate a particular RU from the hierarchy 350 is less than a number of bits required to indicate an allocation of RUs from a similar hierarchy that includes all of the RUs 244 of the first level in the hierarchy 200, according to some embodiments. Although the example set 350 includes four 26-tone RUs, other example hierarchies include other suitable numbers of 26-tone RUs that are not covered by a 52-tone RUs, in other embodiments. For example, various other example set includes only one 26-tone RU in each of two 40 MHz segments in the hierarch, according to an example embodiment. For example, one example set includes only one 26-tone RU, only two 26-tone RUs, only three 26-tone RUs, five 26-tone RUs, etc., according to various embodiments.

Figure 4A:
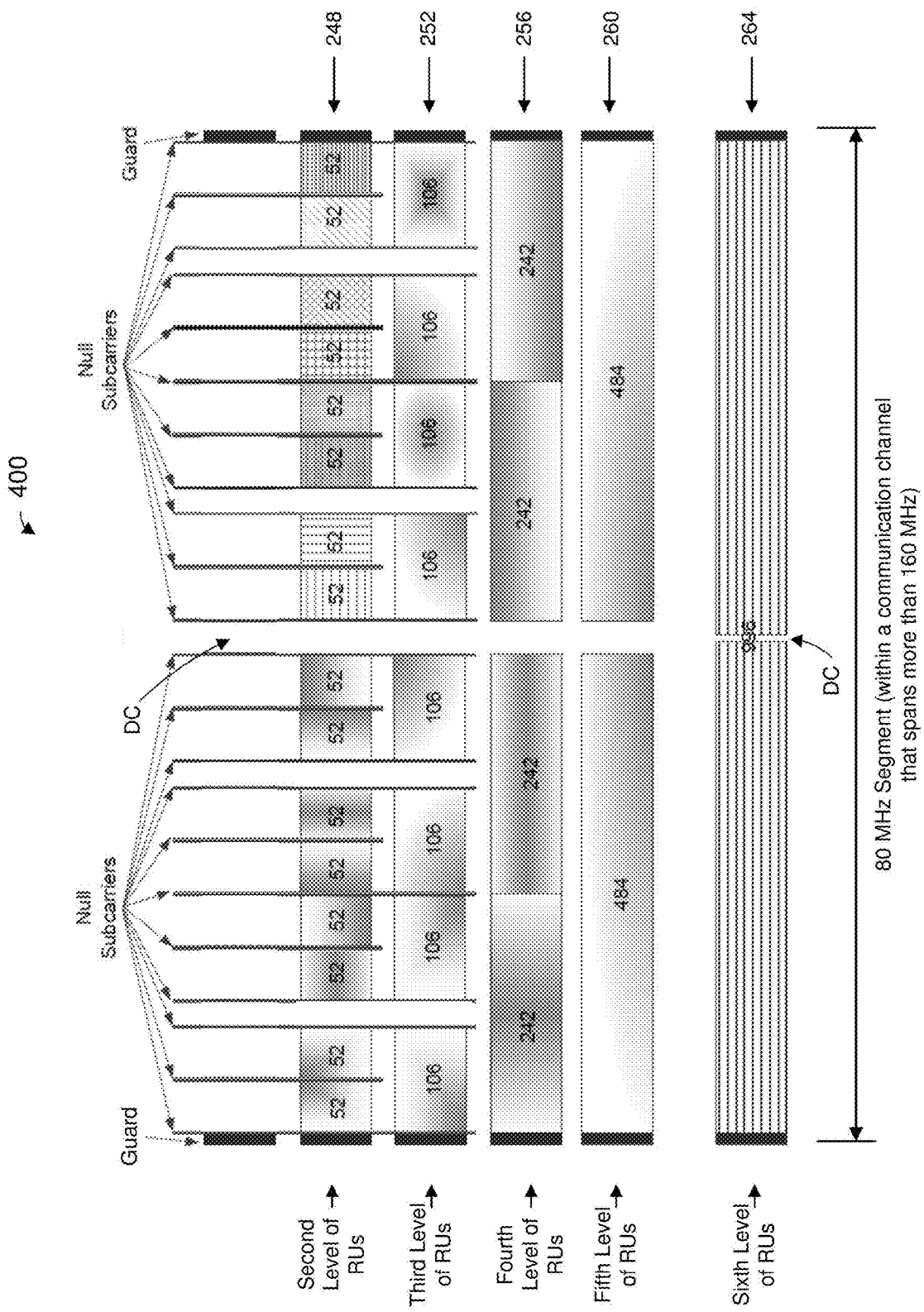
FIG. 4A is a diagram of another example set of frequency RUs, within an 80 MHz segment, that can be allocated for an UL MU transmission in a communication channel that spans more than 160 MHz, according to another embodiment.

FIG. 4A is a diagram of another example set 400 of RUs that can be allocated for an UL MU transmission within an 80 MHz spectrum segment in a communication channel that spans more than 160 MHz, according to another embodiment. The set 400 of RUs corresponds to a hierarchy of RUs corresponding to different bandwidths. In an embodiment, the AP 114 (FIG. 1) is configured to (e.g., the network interface device 122 is configured to, the MAC processor 126 is configured to, the RU allocation processor 142 is configured to, etc.) use the set 400 when selecting RUs for an 80 MHz spectrum segment of an UL MU transmission in a communication channel that spans more than 160 MHz. For example, the RU allocation controller 142 is configured to select RUs from the set 400 when allocating RUs for an MU transmission in a communication channel that spans more than 160 MHz, according to an embodiment.

The set 400 (corresponding to a hierarchy) is similar to the set 300 of FIG. 3A, and like-numbered elements are not described in detail for purposes of brevity. As compared to the sets 200 and 300, the set 400 does not include any RUs 244 (seen in FIG. 3A) in the first level. In other words, no RUs 244 can be allocated for an UL MU transmission in a communication channel that spans more than 160 MHz.

Figure 4B:
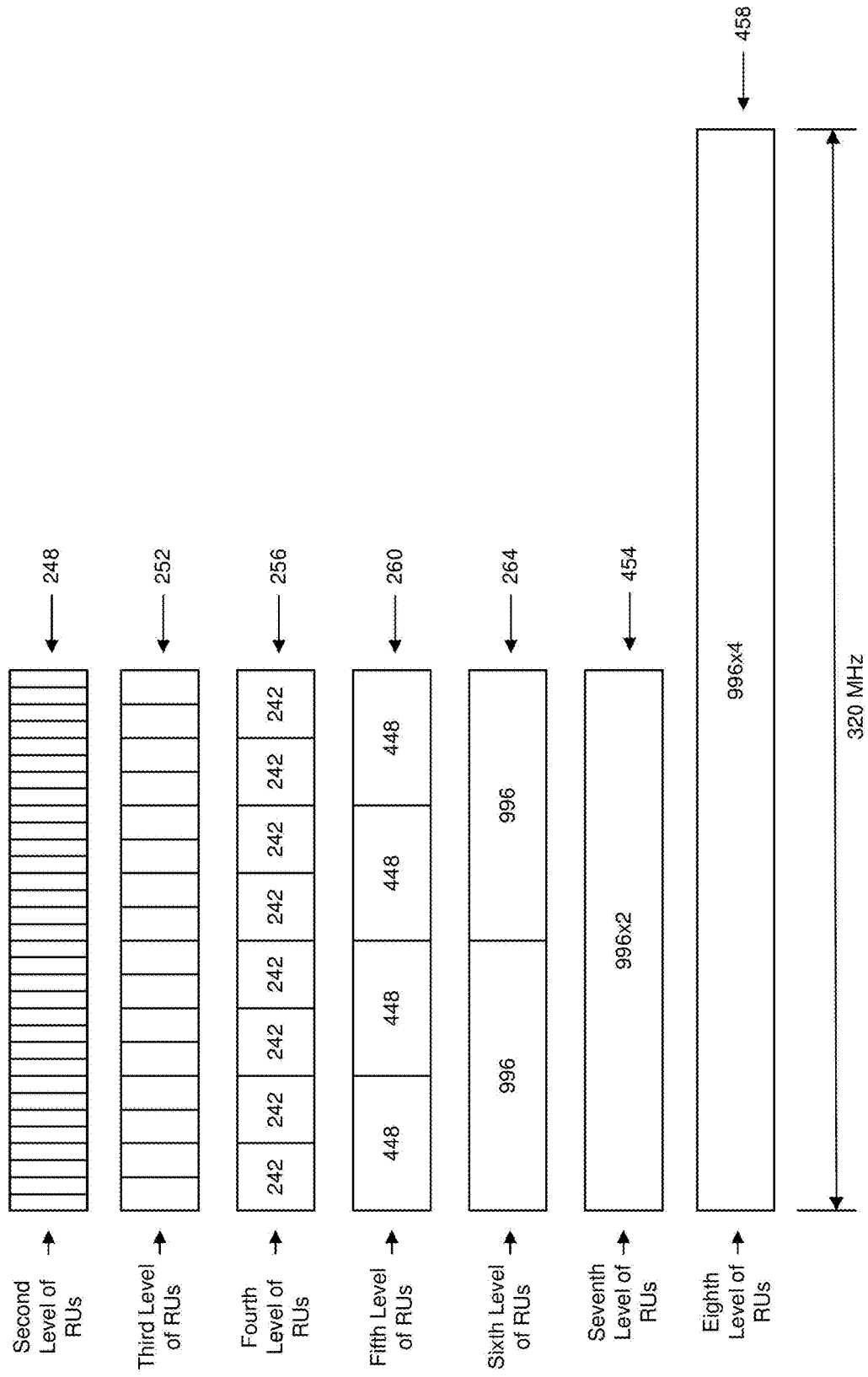
FIG. 4B is a diagram of another example set of frequency RUs that can be allocated for an UL MU transmission in a communication channel that spans more than 160 MHz, according to an embodiment.

FIG. 4B is a diagram of another example set 450 of RUs that can be allocated for an UL MU transmission in a communication channel having a bandwidth greater than 160 MHz, according to another embodiment. The set 450 of RUs corresponds to the hierarchy of RUs of FIG. 4A, but also illustrates seventh and eighth levels of RUs corresponding to bandwidths of 160 MHz and 320 MHz, respectively. In an embodiment, the AP 114 (FIG. 1) is configured to (e.g., the network interface device 122 is configured to, the MAC processor 126 is configured to, the RU allocation processor 142 is configured to, etc.) use the set 450 when selecting RUs for an UL MU transmission in a communication channel that spans more than 160 MHz. For example, the RU allocation controller 142 is configured to select RUs from the set 450 when allocating RUs for an MU transmission in a communication channel that spans more than 160 MHz, according to an embodiment.

FIG. 4B illustrates RUs in the second through seventh levels in only one 160 MHz spectrum segment. Similar RUs for the second through seventh levels are included in another 160 MHz spectrum segment, but are not shown in FIG. 4B for clarity.

The set 450 includes a 996×2-tone RU 454 corresponding to a bandwidth of approximately 160 MHz. The set 450 also includes a 996×4-tone RU 458 corresponding to a bandwidth of approximately 320 MHz. In another embodiment, the set 450 does not include the 996×4-tone RU 458. In various embodiments, the set 450 additionally includes one of, or any suitable combination of two or more of: a 996×2+242-tone RU (not shown) corresponding to a bandwidth of approximately 160+20 MHz, a 996×2+484-tone RU (not shown) corresponding to a bandwidth of approximately 160+40 MHz, and a 996×2+996-tone RU (not shown) corresponding to a bandwidth of approximately 160+80 MHz.

The set 450 (corresponding to a hierarchy) is similar to the set 350 of FIG. 3B, and like-numbered elements are not described in detail for purposes of brevity. As compared to the sets 200, 300, and 350, the set 400 does not include any RUs 244 in the first level. In other words, no RUs 244 an be allocated for an UL MU transmission in a communication channel that spans more than 160 MHz. As a result, a number of bits required to indicate a particular RU from the hierarchy 450 is less than a number of bits required to indicate an allocation of RUs from a similar hierarchy that all of the RUs 244 of the first level in the hierarchy 200, according to some embodiments.

Figure 5A:
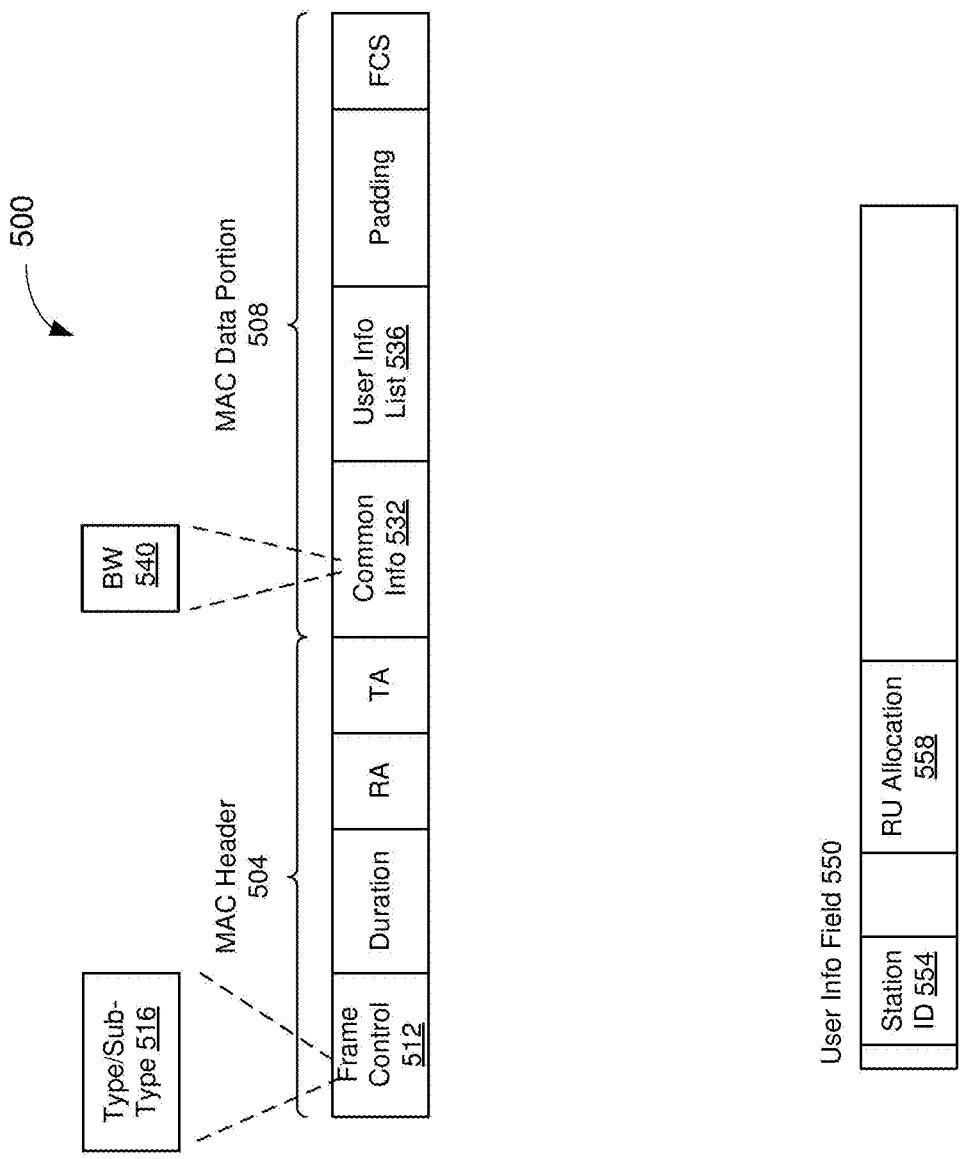
FIG. 5A is a diagram of an example trigger frame that is configured to prompt an UL MU transmission, according to an embodiment.

FIG. 5A is a diagram of an example trigger frame 500 that that the AP 114 is configured to generate and transmit to prompt an UL MU transmission, according to an embodiment. In an embodiment, the network interface 122 is configured to generate the trigger frame 500, include the trigger frame 500 in a packet, and transmit the packet.

The trigger frame 500 is configured to prompt a plurality of client stations 154 to simultaneously transmit as part of an UL MU transmission, according to an embodiment. The trigger frame includes a MAC header 504 and a MAC data portion 508. The MAC header 504 includes a plurality of fields, including a frame control field 512. The frame control field 512 includes type and subtype subfields 516 set to a value that indicates the frame 500 is a trigger-type control frame, according to an embodiment.

The MAC data portion 508 includes a common information field 532 and a plurality 536 of user information fields corresponding to multiple client stations 154. The common information field 532 includes information related to the MU UL transmission that is common to all of the client stations 154 that are to participate in the MU UL transmission. For example, the common information field 532 includes information that indicates an overall bandwidth of the MU UL transmission, according to an embodiment. As a specific example, the common information field 532 includes a bandwidth indicator subfield 540 that indicates the overall bandwidth of the MU UL transmission, according to an embodiment. In an illustrative embodiment, the bandwidth indicator subfield 540 consists of three bits. As an illustrative embodiment, three bits of the bandwidth indicator subfield 540 indicate a bandwidth of the MU UL transmission according to Table 1.

TABLE 1

| BW Subfield Bit Values | Bandwidth of MU UL Transmission |
|---|---|
| 000 | 20 MHz |
| 001 | 40 MHz |
| 010 | 80 MHz |
| 011 | 80 + 80 or 160 MHz |
| 100-111 | Greater than 160 MHz |

As another illustrative embodiment, three bits of the bandwidth indicator subfield 540 indicate a bandwidth of the MU UL transmission according to Table 2.

TABLE 2

| BW Subfield Bit Values | Bandwidth of MU UL Transmission |
|---|---|
| 000 | 20 MHz |
| 001 | 40 MHz |
| 010 | 80 MHz |
| 011 | 80 + 80 or 160 MHz |
| 100 | 160 + 20 MHz |
| 101 | 160 + 40 MHz |
| 110 | 160 + 80 MHz |
| 111 | 320 MHz |

Figure 5B:
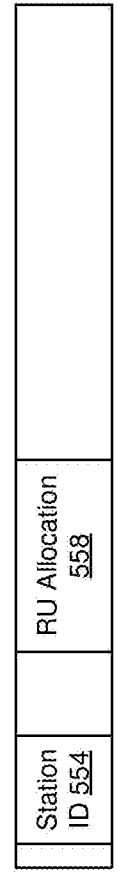
FIG. 5B is a diagram of an example user information field in the trigger frame of FIG. 5A, the user information field including allocation information that indicates a frequency RU that a communication device is to use for the UL MU transmission prompted by the trigger frame, according to an embodiment.

The plurality 536 of user information fields includes a respective user information field for each client station 154 that is to participate in the UL MU transmissions. FIG. 5B is a diagram of an example user information field 550 that is included in the trigger frame 500 of FIG. 5A, according to an embodiment. For example, each user field in the plurality 536 of user information fields (FIG. 5A) has a format the same as or similar to the example user information field 550 of FIG. 5B, according to some embodiments. In other embodiments, each user field in the plurality 536 of user information fields (FIG. 5A) has a suitable format that is different than the example user information field 550 of FIG. 5B.

The user information field 550 includes a station identifier (ID) subfield 554 that includes an identifier of a client station 154 corresponding to the user information field 550. In an embodiment, the station ID subfield 554 includes a 12-bit association identifier (AID) of the client station 154. In an embodiment, the AP 114 assigns a 16-bit AID to a client station 154 when the client station 154 becomes associated with the AP 114, and the 12-bit AID of the client station 154 is the 12 least significant bits of the 16-bit AID. In various other embodiments, the station ID subfield 554 includes more of less than 12 bits of the 16-bit AID, or the station ID subfield 554 includes another suitable identifier of the client station 154.

The user information field 550 also includes an RU allocation subfield 558 that indicates an RU that the client station 154 (identified by the station ID subfield 554) is to use for the UL MU transmission. In an embodiment, the RU allocation subfield 558 indicates an RU selected from a set of RUs such as described with reference to FIGS. 3A-B. In another embodiment, the RU allocation subfield 558 indicates an RU selected from a set of RUs such as described with reference to FIGS. 4A-B. In other embodiments, the RU allocation subfield 558 indicates an RU selected from another suitable set of RUs.

In some embodiments, the RU allocation subfield 558 consists of eight bits. In other embodiments, the RU allocation subfield 558 includes another suitable number of bits greater than eight (e.g., nine, ten, eleven, . . . , sixteen, etc.). In other embodiments, the RU allocation subfield 558 includes another suitable number of bits less than eight (e.g., seven, six, five, etc.).

In some embodiments, a subset of one or more bits of the RU allocation subfield 558 indicates to which spectrum segment, among a plurality of spectrum segments of the communication channel, an RU corresponds. For example, in some embodiments, one bit of the RU allocation subfield 558 indicates whether the RU corresponds to a first 160 MHz spectrum segment or a second 160 MHz spectrum segment. As an illustrative embodiment, a first value of the one bit of the RU allocation subfield 558 indicates that the RU corresponds to a primary 160 MHz channel segment of the communication channel, whereas a second value of the one bit of the RU allocation subfield 558 indicates that the RU corresponds to a non-primary 160 MHz spectrum segment of the communication channel. As another illustrative embodiment, a first value of the one bit of the RU allocation subfield 558 indicates that the RU corresponds to a lower frequency 160 MHz channel segment of the communication channel, whereas a second value of the one bit of the RU allocation subfield 558 indicates that the RU corresponds to an upper 160 MHz spectrum segment of the communication channel. In one embodiment, the one bit is a least significant bit of the RU allocation subfield 558. In another embodiment, the one bit is a most significant bit of the RU allocation subfield 558. In other embodiments, the one bit is a suitable bit of the RU allocation subfield 558 other than the least significant bit and the most significant bit.

Table 3 illustrates an example mapping of bits of the RU allocation subfield 558 to RUs for a communication channel that is wider than 160 MHz, and assumes that the RU allocation subfield 558 consists of eight bits, according to an embodiment. In the example mapping of Table 3, a first value of a least significant bit (B0) of the RU allocation subfield 558 indicates that the RU corresponds to a primary 160 MHz channel segment of the communication channel, whereas a second value of B0 of the RU allocation subfield 558 indicates that the RU corresponds to a non-primary 160 MHz spectrum segment of the communication channel. In another embodiment, a first value of B0 of the RU allocation subfield 558 indicates that the RU corresponds to a lower frequency 160 MHz channel segment of the communication channel, whereas a second value of B0 bit of the RU allocation subfield 558 indicates that the RU corresponds to an upper 160 MHz spectrum segment of the communication channel.

Table 3 corresponds to an example set of RUs such as described with reference to FIGS. 3A-B.

TABLE 3

| RU Allocation Subfield values for bits B1-B7 | RU Allocation |
|---|---|
| 0-31 | Indicates a respective 52-tone RU within the 160 MHz spectrum segment indicated by bit B0, where 0 indicates a lowest frequency 52-tone RU and 31 indicates a highest frequency 52-tone RU |
| 37-52 | Indicates a respective 106-tone RU within the 160 MHz spectrum segment indicated by bit B0, where 37 indicates a lowest frequency 106-tone RU and 52 indicates a highest frequency 106-tone RU |
| 53-60 | Indicates a respective 242-tone RU within the 160 MHz spectrum segment indicated by bit B0, where 53 indicates a lowest frequency 242-tone RU and 60 indicates a highest frequency 242-tone RU |
| 61-64 | Indicates a respective 484-tone RU within the 160 MHz spectrum segment indicated by bit B0, where 61 indicates a lowest frequency 484-tone RU and 64 indicates a highest frequency 484-tone RU |
| 65-66 | Indicates a respective 996-tone RU within the 160 MHz spectrum segment indicated by bit B0, where 65 indicates a lowest frequency 996-tone RU and 66 indicates a highest frequency 996-tone RU |

TABLE 3-continued

| RU Allocation Subfield values for bits B1-B7 | RU Allocation |
|---|---|
| 67 | Indicates a 996x2-tone RU within the 160 MHz spectrum segment indicated by bit B0 |
| 68 | Indicates a 996x4-tone RU corresponding to 320 MHz bandwidth (bit B0 is don't care) |
| 69-73 | Indicates a respective one of five 26-tone RUs (not covered by any 52-tone RUs) within the 160 MHz spectrum segment indicated by bit B0, where 69 indicates a lowest frequency 26-tone RU and 73 indicates a highest frequency 26-tone RU |
| 74-127 | Reserved |

In another embodiment, a 996×4-tone RU is not permitted for an UL MU transmission, and the value 68 of bits B1-B7 does not indicate a 996×4-tone RU; rather values 68-72 indicate respective ones of five 26-tone RUs (not covered by any 52-tone RUs) within the 160 MHz spectrum segment indicated by bit B0, where 69 indicates a lowest frequency 26-tone RU and 73 indicates a highest frequency 26-tone RU. In other embodiments in which less than or more than five 26-tone RUs are permitted, suitable values of bits B1-B7 respectively indicate permitted 26-tone RUs.

In some embodiments, one or more suitable values indicated as reserved in Table 3 are used to indicate one of, or any suitable combination of two or more of: a 996×2+242-tone RU corresponding to a bandwidth of approximately 160+20 MHz, a 996×2+484-tone RU corresponding to a bandwidth of approximately 160+40 MHz, and a 996×2+996-tone RU corresponding to a bandwidth of approximately 160+80 MHz. In at least some such embodiments, it is assumed that the 160 MHz portion of the RU is located in the 160 MHz channel segment indicated by B0.

Table 4 describes another example mapping of bits of the RU allocation subfield 558 to RUs for a communication channel that is wider than 160 MHz, and assumes that the RU allocation subfield 558 consists of eight bits, according to another embodiment. In the example mapping of Table 4, a first value of B0 of the RU allocation subfield 558 indicates that the RU corresponds to a primary 160 MHz channel segment of the communication channel, whereas a second value of B0 of the RU allocation subfield 558 indicates that the RU corresponds to a non-primary 160 MHz spectrum segment of the communication channel. In another embodiment, a first value of B0 of the RU allocation subfield 558 indicates that the RU corresponds to a lower frequency 160 MHz channel segment of the communication channel, whereas a second value of B0 bit of the RU allocation subfield 558 indicates that the RU corresponds to an upper 160 MHz spectrum segment of the communication channel.

Table 4 corresponds to an example set of RUs such as described with reference to FIGS. 3A-B.

TABLE 4

| RU Allocation Subfield values for bits B1-B7 | RU Allocation |
|---|---|
| 0-31 | Indicates a respective 52-tone RU within the 160 MHz spectrum segment indicated by bit B0, where 0 indicates a lowest frequency 52-tone RU and 31 indicates a highest frequency 52-tone RU |
| 32-47 | Indicates a respective 106-tone RU within the 160 MHz spectrum segment indicated by bit B0, where 32 indicates a lowest frequency 106-tone RU and 47 indicates a highest frequency 106-tone RU |
| 48-55 | Indicates a respective 242-tone RU within the 160 MHz spectrum segment indicated by bit B0, where 48 indicates a lowest frequency 242-tone RU and 55 indicates a highest frequency 242-tone RU |
| 56-59 | Indicates a respective 484-tone RU within the 160 MHz spectrum segment indicated by bit B0, where 56 indicates a lowest frequency 484-tone RU and 59 indicates a highest frequency 484-tone RU |
| 60-61 | Indicates a respective 996-tone RU within the 160 MHz spectrum segment indicated by bit B0, where 60 indicates a lowest frequency 996-tone RU and 61 indicates a highest frequency 996-tone RU |
| 62 | Indicates a 996x2-tone RU within the 160 MHz spectrum segment indicated by bit B0 |
| 63 | Indicates a 996x4-tone RU corresponding to 320 MHz bandwidth (bit B0 is don't care) |
| 68-72 | Indicates a respective one of five 26-tone RUs (not covered by any 52-tone RUs) within the 160 MHz spectrum segment indicated by bit B0, where 68 indicates a lowest frequency 26-tone RU and 72 indicates a highest frequency 26-tone RU |
| 73-127 | Reserved |

In another embodiment, a 996×4-tone RU is not permitted for an UL MU transmission, and the value 63 of bits B1-B7 does not indicate a 996×4-tone RU. In other embodiments in which less than or more than five 26-tone RUs are permitted, suitable values of bits B1-B7 respectively indicate permitted 26-tone RUs.

In some embodiments, one or more suitable values indicated as reserved in Table 4 are used to indicate one of, or any suitable combination of two or more of: a 996×2+242-tone RU corresponding to a bandwidth of approximately 160+20 MHz, a 996×2+484-tone RU corresponding to a bandwidth of approximately 160+40 MHz, and a 996×2+996-tone RU corresponding to a bandwidth of approximately 160+80 MHz. In at least some such embodiments, it is assumed that the 160 MHz portion of the RU is located in the 160 MHz channel segment indicated by B0.

Table 5 describes another example mapping of bits of the RU allocation subfield 558 to RUs for a communication channel that is wider than 160 MHz, and assumes that the RU allocation subfield 558 consists of eight bits, according to another embodiment.

Table 5 corresponds to an example set of RUs such as described with reference to FIGS. 3A-B, according to some embodiments.

TABLE 5

| Bits B7-B5 | Bits B4-B0 |
|---|---|
| Indicates starting frequency of RU, at a granularity of 40 MHz | Indicates width of RU |

In the example of Table 5, bits B7-B5 indicate a starting frequency of the RU within the communication channel that is wider than 160 MHz. Bits B7-B5 indicate the starting frequency at a granularity of 40 MHz, according to an embodiment. Bits B4-B0 indicate a width of the RU from a set of allowable widths respectively corresponding to 26-tone RUs, 52-tone RUs, 106-tone RUs, 242-tone RUs, 484-tone RUs, 996-tone RUs, 996×2-tone RUs, and a 996×4-tone RU. In some embodiments, a 996×4-tone RU is not permitted. In some embodiments, the set of allowable widths further includes one of, or any suitable combination of two or more of, widths corresponding to: a 996×2+242-tone RU corresponding to a bandwidth of approximately 160+20 MHz, a 996×2+484-tone RU corresponding to a bandwidth of approximately 160+40 MHz, and a 996×2+996-tone RU corresponding to a bandwidth of approximately 160+80 MHz.

Table 6 describes another example mapping of bits of the RU allocation subfield 558 to RUs for a communication channel that is wider than 160 MHz, and assumes that the RU allocation subfield 558 consists of eight bits, according to another embodiment. In the example mapping of Table 6, a first value of B0 of the RU allocation subfield 558 indicates that the RU corresponds to a primary 160 MHz channel segment of the communication channel, whereas a second value of B0 of the RU allocation subfield 558 indicates that the RU corresponds to a non-primary 160 MHz spectrum segment of the communication channel. In another embodiment, a first value of B0 of the RU allocation subfield 558 indicates that the RU corresponds to a lower frequency 160 MHz channel segment of the communication channel, whereas a second value of B0 bit of the RU allocation subfield 558 indicates that the RU corresponds to an upper 160 MHz spectrum segment of the communication channel.

Table 6 corresponds to an example set of RUs such as described with reference to FIGS. 4A-B.

TABLE 6

| RU Allocation Subfield values for bits B1-B7 | RU Allocation |
| --- | --- |
| 0-31 | Indicates a respective 52-tone RU within the 160 MHz spectrum segment indicated by bit B0, where 0 indicates a lowest frequency 52-tone RU and 31 indicates a highest frequency 52-tone RU |
| 37-52 | Indicates a respective 106-tone RU within the 160 MHz spectrum segment indicated by bit B0, where 37 indicates a lowest frequency 106-tone RU and 52 indicates a highest frequency 106-tone RU |
| 53-60 | Indicates a respective 242-tone RU within the 160 MHz spectrum segment indicated by bit B0, where 53 indicates a lowest frequency 242-tone RU and 60 indicates a highest frequency 242-tone RU |
| 61-64 | Indicates a respective 484-tone RU within the 160 MHz spectrum segment indicated by bit B0, where 61 indicates a lowest frequency 484-tone RU and 64 indicates a highest frequency 484-tone RU |
| 65-66 | Indicates a respective 996-tone RU within the 160 MHz spectrum segment indicated by bit B0, where 65 indicates a lowest frequency 996-tone RU and 66 indicates a highest frequency 996-tone RU |
| 67 | Indicates a 996x2-tone RU within the 160 MHz spectrum segment indicated by bit B0 |
| 68 | Indicates a 996x4-tone RU corresponding to 320 MHz bandwidth (bit B0 is don't care) |
| 69-127 | Reserved |

In another embodiment, a 996×4-tone RU is not permitted for an UL MU transmission, and the value 68 of bits B1-B7 does not indicate a 996×4-tone RU, e.g., values 68-127 are reserved values.

In some embodiments, one or more suitable values indicated as reserved in Table 6 are used to indicate one of, or any suitable combination of two or more of: a 996×2+242-tone RU corresponding to a bandwidth of approximately 160+20 MHz, a 996×2+484-tone RU corresponding to a bandwidth of approximately 160+40 MHz, and a 996×2+996-tone RU corresponding to a bandwidth of approximately 160+80 MHz. In at least some such embodiments, it is assumed that the 160 MHz portion of the RU is located in the 160 MHz channel segment indicated by B0.

Table 7 describes another example mapping of bits of the RU allocation subfield 558 to RUs for a communication channel that is wider than 160 MHz, and assumes that the RU allocation subfield 558 consists of eight bits, according to another embodiment. In the example mapping of Table 7, a first value of B0 of the RU allocation subfield 558 indicates that the RU corresponds to a primary 160 MHz channel segment of the communication channel, whereas a second value of B0 of the RU allocation subfield 558 indicates that the RU corresponds to a non-primary 160 MHz spectrum segment of the communication channel. In another embodiment, a first value of B0 of the RU allocation subfield 558 indicates that the RU corresponds to a lower frequency 160 MHz channel segment of the communication channel, whereas a second value of B0 bit of the RU allocation subfield 558 indicates that the RU corresponds to an upper 160 MHz spectrum segment of the communication channel.

Table 7 corresponds to an example set RUs such as described with reference to FIGS. 4A-B.

TABLE 7

| RU Allocation Subfield values for bits B1-B7 | RU Allocation |
| --- | --- |
| 0-31 | Indicates a respective 52-tone RU within the 160 MHz spectrum segment indicated by bit B0, where 0 indicates a lowest frequency 52-tone RU and 31 indicates a highest frequency 52-tone RU |
| 32-47 | Indicates a respective 106-tone RU within the 160 MHz spectrum segment indicated by bit B0, where 32 indicates a lowest frequency 106-tone RU and 47 indicates a highest frequency 106-tone RU |
| 48-55 | Indicates a respective 242-tone RU within the 160 MHz spectrum segment indicated by bit B0, where 48 indicates a lowest frequency 242-tone RU and 55 indicates a highest frequency 242-tone RU |
| 56-59 | Indicates a respective 484-tone RU within the 160 MHz spectrum segment indicated by bit B0, where 56 indicates a lowest frequency 484-tone RU and 59 indicates a highest frequency 484-tone RU |
| 60-61 | Indicates a respective 996-tone RU within the 160 MHz spectrum segment indicated by bit B0, where 60 indicates a lowest frequency 996-tone RU and 61 indicates a highest frequency 996-tone RU |
| 62 | Indicates a 996x2-tone RU within the 160 MHz spectrum segment indicated by bit B0 |
| 63 | Indicates a 996x4-tone RU corresponding to 320 MHz bandwidth (bit B0 is don't care) |
| 64-127 | Reserved |

In another embodiment, a 996×4-tone RU is not permitted for an UL MU transmission, and the value 63 of bits B1-B7 does not indicate a 996×4-tone RU, e.g., values 63-127 are reserved values.

In some embodiments, one or more suitable values indicated as reserved in Table 7 are used to indicate one of, or any suitable combination of two or more of: a 996×2+242-tone RU corresponding to a bandwidth of approximately 160+20 MHz, a 996×2+484-tone RU corresponding to a bandwidth of approximately 160+40 MHz, and a 996×2+996-tone RU corresponding to a bandwidth of approximately 160+80 MHz. In at least some such embodiments, it is assumed that the 160 MHz portion of the RU is located in the 160 MHz channel segment indicated by B0.

Referring again to Table 5, in another embodiment, the mapping of Table 5 is used with an example set RUs such as described with reference to FIGS. 4A-B. For example, bits B4-B0 indicate a width of the RU from a set of allowable widths respectively corresponding to 52-tone RUs, 106-tone RUs, 242-tone RUs, 484-tone RUs, 996-tone RUs, 996×2-tone RUs, and a 996×4-tone RU. In some embodiments, a 996×4-tone RU is not permitted. In some embodiments, the set of allowable widths further includes one of, or any suitable combination of two or more of, widths corresponding to: a 996×2+242-tone RU corresponding to a bandwidth of approximately 160+20 MHz, a 996×2+484-tone RU corresponding to a bandwidth of approximately 160+40 MHz, and a 996×2+996-tone RU corresponding to a bandwidth of approximately 160+80 MHz.

FIG. 6 is a flow diagram of an example method 600 for allocating frequency resources for an UL MU communication in a WLAN, according to an embodiment. In some embodiments, the method 600 is performed in connection with a communication protocol that defines a first set of RUs of different bandwidths for use with communication channels spanning at most 160 MHz and a second set of RUs for use with communication channels spanning more than 160 MHz. The first set of frequency RUs includes at least a first subset of frequency RUs having a first bandwidth and a second set of RUs having a second bandwidth greater than the first bandwidth, and wherein the second set of frequency RUs omits at least some of the frequency RUs in the first subset of frequency RUs of the first set of frequency RUs, according to an embodiment.

As an illustrative example, the first set of RUs corresponds to a set of RUs the same as or similar to the set of RUs illustrated in FIG. 2, and the second set of RUs corresponds to a set of RUs the same as or similar to the set of RUs illustrated in FIGS. 3A and/or 3B, according to an embodiment. As another illustrative example, the first set of RUs corresponds to a set of RUs the same as or similar to the set of RUs illustrated in FIG. 2, and the second set of RUs corresponds to a set of RUs the same as or similar to the set of RUs illustrated in FIGS. 4A and/or 4B, according to another embodiment. In other embodiments, other suitable first and second sets of RUs are utilized in connection with the method 600.

In an embodiment, the second set of frequency RUs omits all of the frequency RUs in the first subset of frequency RUs of the first set of frequency RUs. In another embodiment, the second set of frequency RUs additionally or alternatively includes one or more frequency RUs having one or more respective frequency bandwidths greater than 160 MHz.

In some embodiments, the first subset of frequency RUs of the first set of frequency RUs corresponds to a smallest RU bandwidth among the RUs included in the first set of frequency RUs.

The method 600 is implemented by a communication device having a structure the same as or similar to the AP 114 of FIG. 1, and the method 600 is described with reference to FIG. 1 for ease of explanation. In other embodiments, however, the method 600 is implemented by a communication device having a suitable structure different than the AP 114 of FIG. 1.

At block 604, a communication device determines (e.g., the network interface device 122 determines, the MAC processor 126 determines, the controller 142 determines, etc.) that a communication channel to be used for an UL MU transmission spans a frequency bandwidth greater than 160 MHz.

At block 608, the communication device allocates (e.g., the network interface device 122 allocates, the MAC processor 126 allocates, the controller 142 allocates, etc.) one or more RUs for the UL MU transmission. In an embodiment, allocating RUs at block 608 comprises: in response to determining that the communication channel spans the frequency bandwidth greater than 160 MHz, selecting one or more frequency RUs from the second set of frequency RUs.

In various embodiments, selecting the one or more frequency RUs from the second set of frequency RUs at block 608 comprises selecting the one or more frequency RUs from a set of frequency RUs such as described above with reference to FIGS. 3A-B and 4A-B, or from another suitable set of frequency RUs. For example, in some embodiments, the first set of frequency RUs includes a subset of RUs having a bandwidth corresponding to 26 OFDM tones, and the second set of frequency RUs omits at least some of the RUs in the subset of RUs having the bandwidth corresponding to 26 OFDM tones. In some embodiments, the second set of frequency RUs omits all RUs having the bandwidth corresponding to 26 OFDM tones.

At block 612, the communication device generates (e.g., the network interface device 122 generates, the MAC processor 126 generates, the controller 142 generates, etc.) allocation information that indicates the allocation of the one or more frequency RUs for the UL MU transmission. In some embodiments, the method 600 further comprises the communication device generating (e.g., the network interface device 122 generating, the MAC processor 126 generating, the controller 142 generating, etc.) a trigger frame to include the allocation information generated at block 612.

At block 616, the communication device transmits (e.g., the network interface device 122 transmits, the PHY processor 130 transmits, etc.) the allocation information to one or more other communication devices in connection with the UL MU transmission. In embodiments in which the method 600 includes generating a trigger frame to include the allocation information, transmitting the allocation information at block 616 includes transmitting the allocation information in the trigger frame.

In some embodiments in which the method 600 includes generating a trigger frame to include the allocation information, generating the trigger frame comprises: the communication device generating (e.g., the network interface device 122 generating, the MAC processor 126 generating, the controller 142 generating, etc.) a common information field to include a bandwidth subfield that indicates the UL MU transmission is to have a bandwidth greater than 160 MHz; and the communication device generating (e.g., the network interface device 122 generating, the MAC processor 126 generating, the controller 142 generating, etc.) one or more user information subfields corresponding to the one or more other communication devices, where each user information subfield is generated to include i) a respective first subfield that includes an identifier of the respective other communication device, and ii) a respective RU allocation subfield that indicates a respective RU allocated to the respective other communication device.

In various embodiments, generating the bandwidth subfield comprises: the communication device generating (e.g., the network interface device 122 generating, the MAC processor 126 generating, the controller 142 generating, etc.) the bandwidth subfield according to Tables 1 or 2, or according to other suitable encodings of bandwidth information.

In some embodiments, generating the respective RU allocation subfield comprises: the communication device generating (e.g., the network interface device 122 generating, the MAC processor 126 generating, the controller 142 generating, etc.) a first set of one or more bits of the RU allocation subfield that indicates a spectrum segment within the communication channel to be used for the UL MU transmission; and the communication device generating (e.g., the network interface device 122 generating, the MAC processor 126 generating, the controller 142 generating, etc.) a second set of multiple bits of the RU allocation subfield that indicates the respective RU, within the spectrum segment indicated by the first set of one or more bits, allocated to the respective other communication device.

In some embodiments, generating the respective RU allocation subfield comprises: the communication device generating (e.g., the network interface device 122 generating, the MAC processor 126 generating, the controller 142 generating, etc.) a first set of multiple bits of the RU allocation subfield that indicates a starting frequency, within the communication channel to be used for the UL MU transmission, of the RU allocated to the respective other communication device; and the communication device generating (e.g., the network interface device 122 generating, the MAC processor 126 generating, the controller 142 generating, etc.) a second set of multiple bits of the RU allocation subfield that indicates a frequency bandwidth of the respective RU allocated to the respective other communication device.

In some embodiments, generating the first set of multiple bits of the RU allocation subfield comprises: the communication device generating (e.g., the network interface device 122 generating, the MAC processor 126 generating, the controller 142 generating, etc.) the first set of multiple bits of the RU allocation subfield to indicate the starting frequency to a granularity of 40 MHz.

In various embodiments, generating the respective RU allocation subfield comprises: the communication device generating (e.g., the network interface device 122 generating, the MAC processor 126 generating, the controller 142 generating, etc.) the respective RU allocation subfield according to mappings such as discussed above with reference to Tables 3-7, or according to other suitable mappings.

In some embodiments, generating the respective RU allocation subfield comprises: the communication device generating (e.g., the network interface device 122 generating, the MAC processor 126 generating, the controller 142 generating, etc.) the respective RU allocation subfield to consist of eight bits. In other embodiments, generating the respective RU allocation subfield comprises: the communication device generating (e.g., the network interface device 122 generating, the MAC processor 126 generating, the controller 142 generating, etc.) the respective RU allocation subfield to consist of a suitable number of bits other than eight, such as six, seven, nine, ten, . . . sixteen, seventeen, etc.

Figure 7:
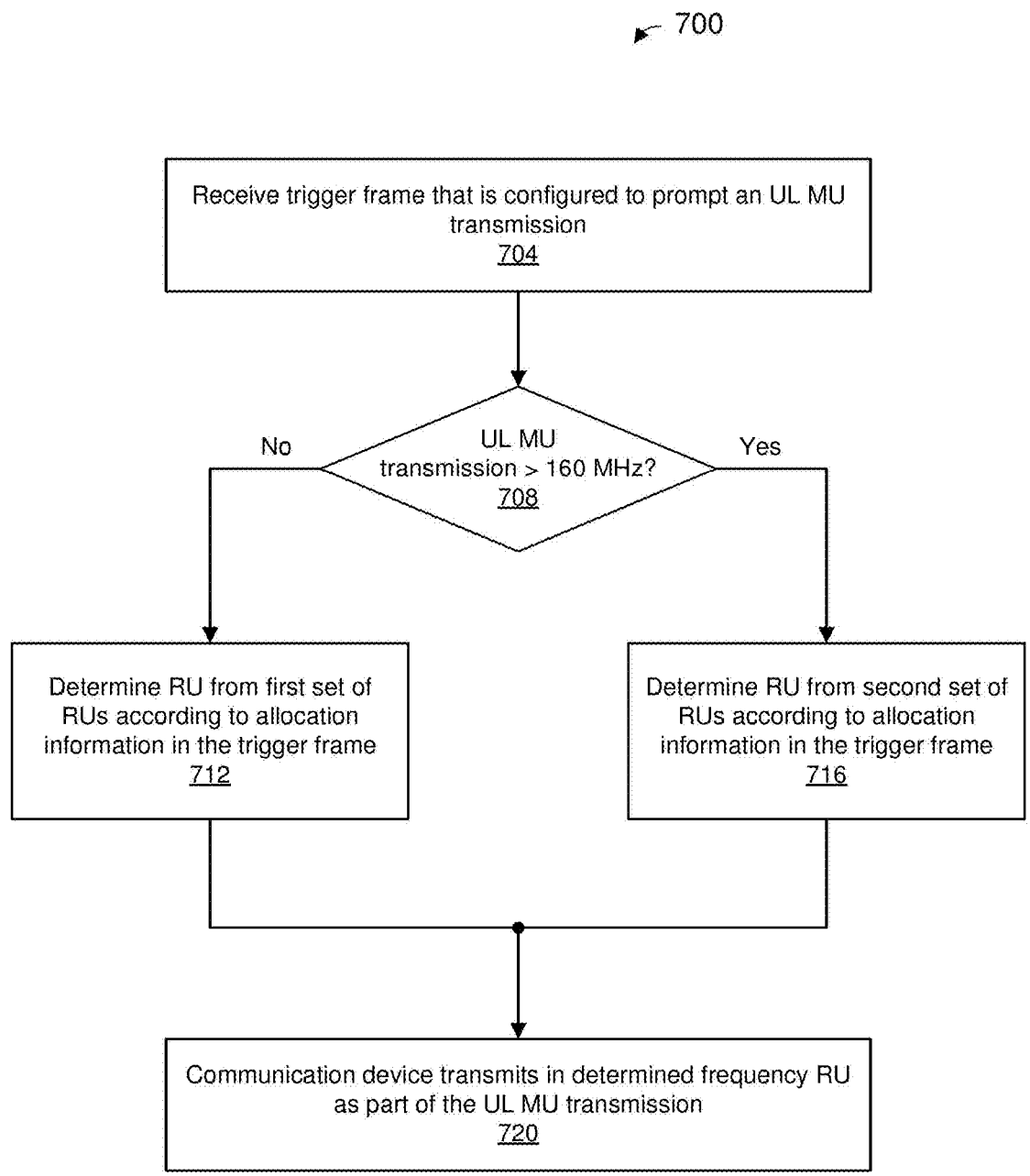
FIG. 7 is a flow diagram of an example method for participating in an UL MU communication in a WLAN, according to an embodiment.

FIG. 7 is a flow diagram of an example method 700 for participating in an UL MU communication in a WLAN, according to an embodiment. In some embodiments, the method 700 is performed in connection with a communication protocol that defines a first set of RUs of different bandwidths for use with communication channels spanning at most 160 MHz and a second set of RUs for use with communication channels spanning more than 160 MHz. The first set of frequency RUs includes at least a first subset of frequency RUs having a first bandwidth and a second set of RUs having a second bandwidth greater than the first bandwidth, and wherein the second set of frequency RUs omits at least some of the frequency RUs in the first subset of frequency RUs of the first set of frequency RUs, according to an embodiment.

As an illustrative example, the first set of RUs corresponds to a set of RUs the same as or similar to the set of RUs illustrated in FIG. 2, and the second set of RUs corresponds to a set of RUs the same as or similar to the set of RUs illustrated in FIGS. 3A and/or 3B, according to an embodiment. As another illustrative example, the first set of RUs corresponds to a set of RUs the same as or similar to the set of RUs illustrated in FIG. 2, and the second set of RUs corresponds to a set of RUs the same as or similar to the set of RUs illustrated in FIGS. 4A and/or 4B, according to another embodiment. In other embodiments, other suitable first and second sets of RUs are utilized in connection with the method 700.

In an embodiment, the second set of frequency RUs omits all of the frequency RUs in the first subset of frequency RUs of the first set of frequency RUs. In another embodiment, the second set of frequency RUs additionally or alternatively includes one or more frequency RUs having one or more respective frequency bandwidths greater than 160 MHz.

In some embodiments, the first subset of frequency RUs of the first set of frequency RUs corresponds to a smallest RU bandwidth among the RUs included in the first set of frequency RUs.

The method 700 is implemented by a communication device having a structure the same as or similar to the client station 154-1 of FIG. 1, and the method 700 is described with reference to FIG. 1 for ease of explanation. In other embodiments, however, the method 700 is implemented by a communication device having a suitable structure different than the client station 154-1 of FIG. 1.

At block 704, a communication device receives (e.g., the network interface device 162 receives, the MAC processor 166 receives, the RU allocation processor 192 receives, etc.) a trigger frame that is configured to prompt an UL MU transmission. In various embodiments, receiving the trigger frame at block 704 comprises receiving a trigger frame having a format such as discussed above with reference to FIGS. 5A-B, or another suitable format.

At block 708, the communication device processes (e.g., the network interface device 162 processes, the MAC processor 166 processes, the RU allocation processor 192 processes, etc.) information in the trigger frame to determine whether an overall bandwidth of the UL MU transmission exceeds 160 MHz. For example, in embodiments in which the trigger frame received at block 704 includes a field that indicates a bandwidth of the UL MU transmission, processing the trigger frame at block 708 comprises evaluating bandwidth information in field that indicates the bandwidth of the UL MU transmission to determine whether the overall bandwidth of the UL MU transmission exceeds 160 MHz. For instance, in embodiments in which the trigger frame received at block 704 has a format such as discussed above with reference to FIG. 5A, processing the trigger frame at block 708 comprises evaluating bandwidth information in the bandwidth subfield 540 to determine whether the overall bandwidth of the UL MU transmission exceeds 160 MHz.

In various embodiments, evaluating bandwidth information in the field that indicates the bandwidth of the UL MU transmission at block 708 comprises evaluating bandwidth information in the trigger frame according encodings such as discussed above with reference to Tables 1 or 2, or according to other suitable encodings.

When the communication device determines that the overall bandwidth of the UL MU transmission does not exceed 160 MHz (e.g., is less than or equal to 160 MHz), the flow proceeds to block 712. At block 712, the communication device processes (e.g., the network interface device 162 processes, the MAC processor 166 processes, the RU allocation processor 192 processes, etc.) information in the trigger frame to determine, from the first set of RUs, an RU in which the communication device is to transmit as part of the UL MU transmission. For example, in embodiments in which the trigger frame received at block 704 includes one or more respective user information fields corresponding to one or more communication devices that are to transmit as part of the UL MU transmission, processing information in the trigger frame at block 712 comprises determining a user information field that corresponds to the communication device. For instance, in embodiments in which the trigger frame received at block 704 has a format such as discussed above with reference to FIGS. 5A-B, processing the trigger frame at block 712 comprises evaluating station ID information in one or more station ID subfields 554 to determine a particular user information field 550 that corresponds to the communication device.

In some embodiments in which the trigger frame received at block 704 includes one or more respective user information fields corresponding to one or more communication devices that are to transmit as part of the UL MU transmission, determining the RU in which the communication device is to transmit as part of the UL MU transmission at block 712 comprises processing RU allocation information in a user information field that corresponds to the communication device to determine the RU in which the communication device is to transmit as part of the UL MU transmission. For instance, in embodiments in which the trigger frame received at block 704 has a format such as discussed above with reference to FIGS. 5A-B, determining the RU in which the communication device is to transmit as part of the UL MU transmission at block 712 comprises evaluating RU allocation information in the RU allocation subfield 558 to determine the RU.

On the other hand, when the communication device determines that the overall bandwidth of the UL MU transmission is greater than 160 MHz, the flow proceeds to block 716. At block 716, the communication device processes (e.g., the network interface device 162 processes, the MAC processor 166 processes, the RU allocation processor 192 processes, etc.) information in the trigger frame to determine, from the second set of RUs, an RU in which the communication device is to transmit as part of the UL MU transmission. For example, in embodiments in which the trigger frame received at block 704 includes one or more respective user information fields corresponding to one or more communication devices that are to transmit as part of the UL MU transmission, processing information in the trigger frame at block 716 comprises determining a user information field that corresponds to the communication device. For instance, in embodiments in which the trigger frame received at block 704 has a format such as discussed above with reference to FIGS. 5A-B, processing the trigger frame at block 716 comprises evaluating station ID information in one or more station ID subfields 554 to determine a particular user information field 550 that corresponds to the communication device.

In some embodiments in which the trigger frame received at block 704 includes one or more respective user information fields corresponding to one or more communication devices that are to transmit as part of the UL MU transmission, determining the RU in which the communication device is to transmit as part of the UL MU transmission at block 716 comprises processing RU allocation information in a user information field that corresponds to the communication device to determine the RU in which the communication device is to transmit as part of the UL MU transmission. For instance, in embodiments in which the trigger frame received at block 704 has a format such as discussed above with reference to FIGS. 5A-B, determining the RU in which the communication device is to transmit as part of the UL MU transmission at block 716 comprises evaluating RU allocation information in the RU allocation subfield 558 to determine the RU.

In various embodiments, determining the RU in which the communication device is to transmit as part of the UL MU transmission at block 716 comprises evaluating RU allocation information in the trigger frame according mappings such as discussed above with reference to Tables 3-7, or according to other suitable mappings.

At block 720, the communication device transmits (e.g., the network interface device 162 transmits, the PHY processor 170 transmits, etc.) in the frequency RU determined at block 712 or 716 as part of the UL MU transmission.

Figure 8A:
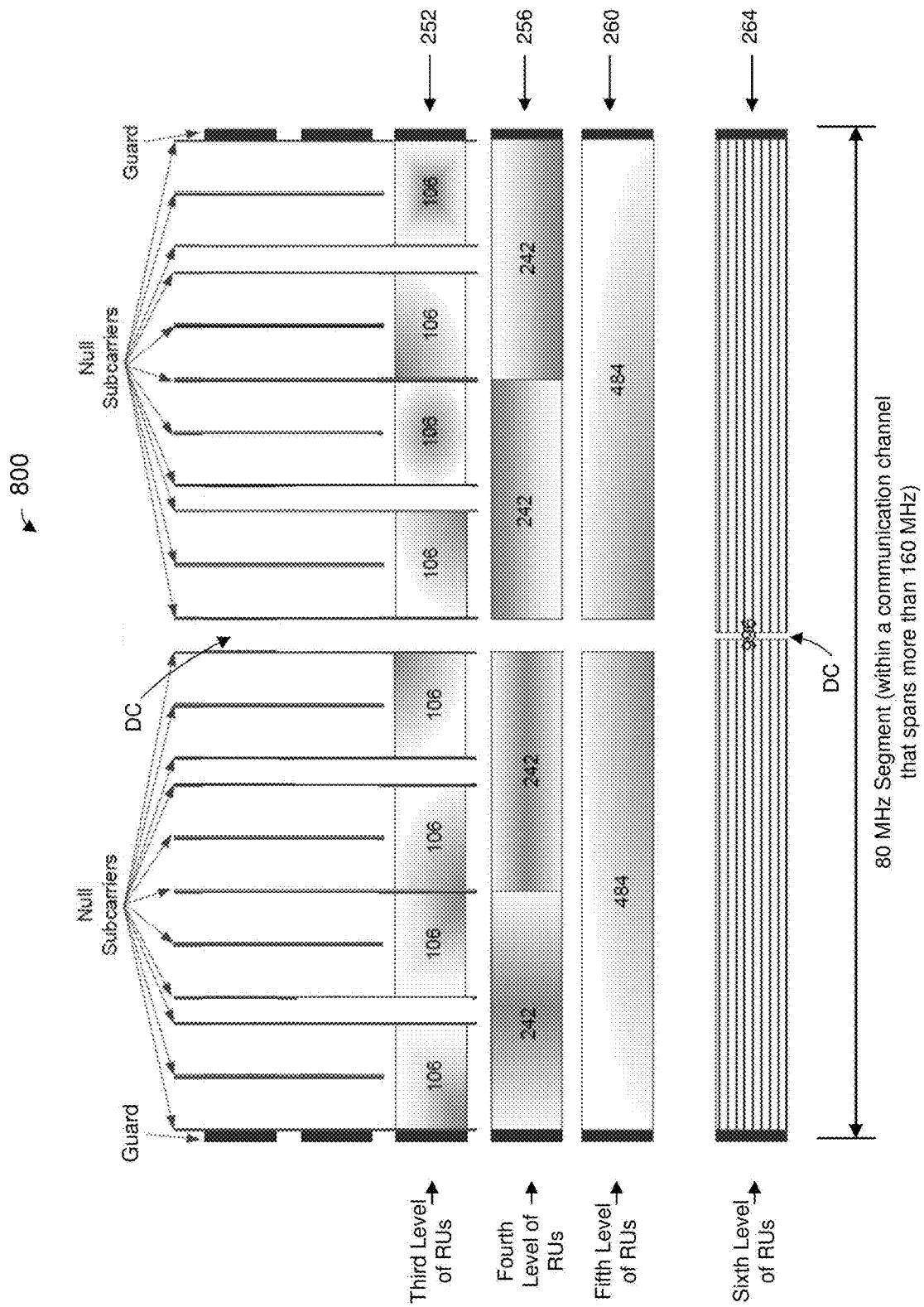
FIG. 8A is a diagram of another example set of frequency RUs, within an 80 MHz segment, that can be allocated for an UL MU transmission in a communication channel that spans more than 160 MHz, according to another embodiment.

FIG. 8A is a diagram of yet another example set 800 of RUs that can be allocated for an UL MU transmission within an 80 MHz spectrum segment in a communication channel that spans more than 160 MHz, according to another embodiment. The set 800 of RUs corresponds to a hierarchy of RUs corresponding to different bandwidths. In an embodiment, the AP 114 (FIG. 1) is configured to (e.g., the network interface device 122 is configured to, the MAC processor 126 is configured to, the RU allocation processor 142 is configured to, etc.) use the set 800 when selecting RUs for an 80 MHz spectrum segment of an UL MU transmission in a communication channel that spans more than 160 MHz. For example, the RU allocation controller 142 is configured to select RUs from the set 800 when allocating RUs for an MU transmission in a communication channel that spans more than 160 MHz, according to an embodiment.

The set 800 (corresponding to a hierarchy) is similar to the set 400 of FIG. 4A, and like-numbered elements are not described in detail for purposes of brevity. As compared to the sets 200 and 300 (FIGS. 2 and 3A), the set 800 does not include any RUs 244 (seen in FIGS. 2 and 3A) in the first level. In other words, no RUs 244 can be allocated for an UL MU transmission in a communication channel that spans more than 160 MHz. Additionally, as compared to the sets 200, 300, and 400, the set 800 does not include any RUs 248 (seen in FIGS. 2, 3A, and 4A) in the second level. In other words, no RUs 248 can be allocated for an UL MU transmission in a communication channel that spans more than 160 MHz.

Figure 8B:
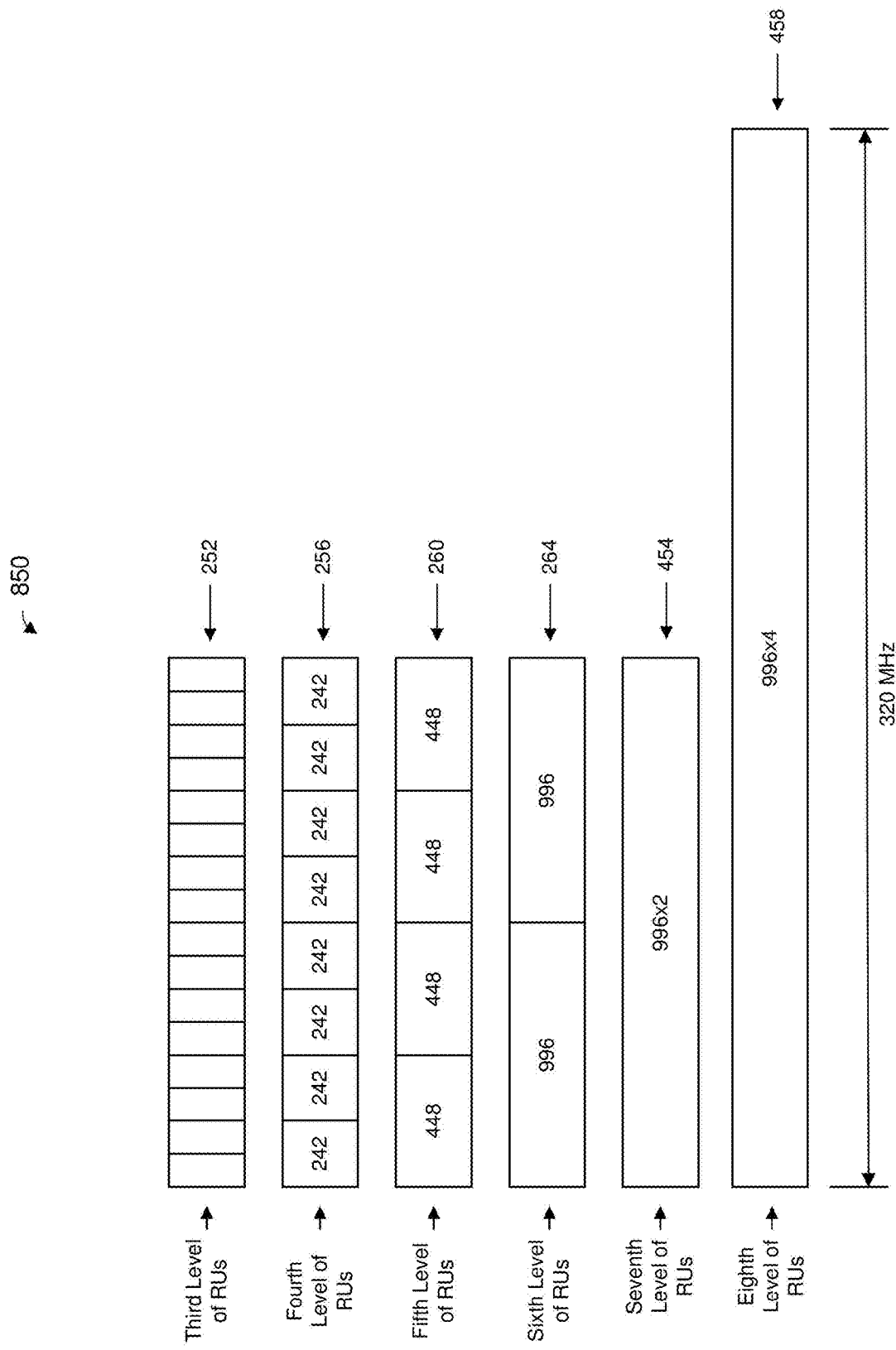
FIG. 8B is a diagram of another example set of frequency RUs that can be allocated for an UL MU transmission in a communication channel that spans more than 160 MHz, according to an embodiment.

FIG. 8B is a diagram of another example set 850 of RUs that can be allocated for an UL MU transmission in a communication channel having a bandwidth greater than 160 MHz, according to another embodiment. The set 850 of RUs corresponds to the hierarchy of RUs of FIG. 8A, but also illustrates seventh and eighth levels of RUs corresponding to bandwidths of 160 MHz and 320 MHz, respectively.

In an embodiment, the AP 114 (FIG. 1) is configured to (e.g., the network interface device 122 is configured to, the MAC processor 126 is configured to, the RU allocation processor 142 is configured to, etc.) use the set 850 when selecting RUs for an UL MU transmission in a communication channel that spans more than 160 MHz. For example, the RU allocation controller 142 is configured to select RUs from the set 850 when allocating RUs for an MU transmission in a communication channel that spans more than 160 MHz, according to an embodiment.

FIG. 8B illustrates RUs in the third through seventh levels in only one 160 MHz spectrum segment. Similar RUs for the third through seventh levels are included in another 160 MHz spectrum segment, but are not shown in FIG. 8B for clarity.

The set 850 includes the 996×2-tone RU 454 corresponding to a bandwidth of approximately 160 MHz. The set 850 also includes the 996×4-tone RU 458 corresponding to a bandwidth of approximately 320 MHz. In another embodiment, the set 850 does not include the 996×4-tone RU 458. In various embodiments, the set 850 additionally includes one of, or any suitable combination of two or more of: a 996×2+242-tone RU (not shown) corresponding to a bandwidth of approximately 160+20 MHz, a 996×2+484-tone RU (not shown) corresponding to a bandwidth of approximately 160+40 MHz, and a 996×2+996-tone RU (not shown) corresponding to a bandwidth of approximately 160+80 MHz.

The set 850 (corresponding to a hierarchy) is similar to the set 450 of FIG. 4B, and like-numbered elements are not described in detail for purposes of brevity. As compared to the sets 200, 300, and 350, the set 800 does not include any RUs 244 in the first level. In other words, no RUs 244 can be allocated for an UL MU transmission in a communication channel that spans more than 160 MHz. Additionally, as compared to the sets 200, 300, 350, 400, and 450, the set 850 does not include any RUs 248 (seen in FIGS. 2, 3A, 3B, 4A, and 4B) in the second level. In other words, no RUs 248 can be allocated for an UL MU transmission in a communication channel that spans more than 160 MHz. As a result, a number of bits required to indicate a particular RU from the hierarchy 850 is less than a number of bits required to indicate an allocation of RUs from a similar hierarchy that includes all of the RUs 244 of the first level all of the RUs 248 of the second level in the hierarchy 200, according to some embodiments.

In some embodiments, the set 800 (FIG. 8A) and/or the set 850 (FIG. 8B) are used in conjunction with the method 600 (FIG. 6). For example, referring to FIGS. 6, 8A, and 8B), selecting the one or more frequency RUs from the second set of frequency RUs at block 608 comprises selecting the one or more frequency RUs from a set of frequency RUs such as described above with reference to FIG. 8A and/or FIG. 8B.

In some embodiments, the set 800 (FIG. 8A) and/or the set 850 (FIG. 8B) are used in conjunction with the method 700 (FIG. 7). For example, referring to FIGS. 7, 8A, and 8B), the first set of RUs corresponds to a set of RUs the same as or similar to the set of RUs illustrated in FIG. 2, and the second set of RUs corresponds to a set of RUs the same as or similar to the set of RUs illustrated in FIGS. 8A and/or 8B.

In some embodiments, the set 800 (FIG. 8A) and/or the set 850 (FIG. 8B) are used in conjunction with the user information field 550 (FIG. 5B).

Embodiment 1: A method for allocating frequency resources for an uplink (UL) multi-user (MU) communication in a wireless local area network (WLAN), wherein a communication protocol defines a first set of frequency resource units (RUs) of different bandwidths for use with communication channels spanning at most 160 MHz and a second set of frequency RUs for use with communication channels spanning more than 160 MHz, wherein the first set of frequency RUs includes at least a first subset of frequency RUs having a first bandwidth and a second set of RUs having a second bandwidth greater than the first bandwidth, and wherein the second set of frequency RUs omits at least some of the frequency RUs in the first subset of frequency RUs of the first set of frequency RUs, the method comprising: determining, at a communication device, that a communication channel to be used for an UL MU transmission spans a frequency bandwidth greater than 160 MHz; allocating, at the communication device, one or more frequency RUs for the UL MU transmission, including: in response to determining that the communication channel spans the frequency bandwidth greater than 160 MHz, selecting one or more frequency RUs from the second set of frequency RUs. The method further comprises: generating, at the communication device, allocation information that indicates the allocation of the one or more frequency RUs for the UL MU transmission; and transmitting, by the communication device, the allocation information to one or more other communication devices in connection with the UL MU transmission.

Embodiment 2: The method of embodiment 1, wherein selecting one or more frequency RUs from the second set of frequency RUs comprises selecting one or more frequency RUs from a set of frequency RUs that omits all of the frequency RUs in the first subset of frequency RUs of the first set of frequency RUs.

Embodiment 3: The method of embodiment 2, wherein selecting one or more frequency RUs from the second set of frequency RUs comprises selecting one or more frequency RUs from a set of frequency RUs that does not include any RUs corresponding to 26 orthogonal frequency division multiplexing (OFDM) tones, and wherein the first set of frequency RUs includes multiple RUs corresponding to 26 OFDM tones.

Embodiment 4: The method of either of embodiments 2 or 3, wherein selecting one or more frequency RUs from the second set of frequency RUs comprises selecting one or more frequency RUs from a set of frequency RUs that does not include any RUs corresponding to 52 orthogonal frequency division multiplexing (OFDM) tones, and wherein the first set of frequency RUs includes multiple RUs corresponding to 52 OFDM tones.

Embodiment 5: The method of any of embodiments 1-4, wherein selecting one or more frequency RUs from the second set of frequency RUs comprises selecting one or more frequency RUs from a set of frequency RUs that includes one or more frequency RUs having one or more respective frequency bandwidths greater than 160 MHz.

Embodiment 6: The method of any of embodiments 1-5, further comprising: generating, at the communication device, a trigger frame configured to prompt the one or more other communication devices to transmit as part of the UL MU transmission, including generating the trigger frame to include the allocation information; wherein transmitting the allocation comprises transmitting the allocation information in the trigger frame.

Embodiment 7: The method of embodiment 6, wherein generating the trigger frame comprises: generating, at the communication device, a common information field to include a bandwidth subfield that indicates the UL MU transmission is to have a bandwidth greater than 160 MHz; and generating, at the communication device, one or more user information subfields corresponding to the one or more other communication devices, where each user information subfield is generated to include i) a respective first subfield that includes an identifier of the respective other communication device, and ii) a respective RU allocation subfield that indicates a respective RU allocated to the respective other communication device.

Embodiment 8: The method of embodiment 7, wherein generating the respective RU allocation subfield comprises: generating, at the communication device, a first set of one or more bits of the RU allocation subfield that indicates a spectrum segment within the communication channel to be used for the UL MU transmission; and generating, at the communication device, a second set of multiple bits of the RU allocation subfield that indicates the respective RU, within the spectrum segment indicated by the first set of one or more bits, allocated to the respective other communication device.

Embodiment 9: The method of embodiment 7, wherein generating the respective RU allocation subfield comprises: generating, at the communication device, a first set of multiple bits of the RU allocation subfield that indicates a starting frequency, within the communication channel to be used for the UL MU transmission, of the RU allocated to the respective other communication device; and generating, at the communication device, a second set of multiple bits of the RU allocation subfield that indicates a frequency bandwidth of the respective RU allocated to the respective other communication device.

Embodiment 10: The method of embodiment 9, wherein generating the first set of multiple bits of the RU allocation subfield comprises: generating the first set of multiple bits of the RU allocation subfield to indicate the starting frequency to a granularity of 40 MHz.

Embodiment 11: The method of any of embodiments 6-10, wherein generating the respective RU allocation subfield comprises: generating the respective RU allocation subfield to consist of eight bits.

Embodiment 12: A communication device configured to operate according to a communication protocol that defines a first set of frequency resource units (RUs) of different bandwidths for use with communication channels spanning at most 160 MHz and a second set of frequency RUs for use with communication channels spanning more than 160 MHz, wherein the first set of frequency RUs includes at least a first subset of frequency RUs having a first bandwidth and a second set of RUs having a second bandwidth greater than the first bandwidth, and wherein the second set of frequency RUs omits at least some of the frequency RUs in the first subset of frequency RUs of the first set of frequency RUs, the communication device comprising: a wireless network interface device having one or more integrated circuit (IC) devices. The one or more IC devices are configured to: determine that a communication channel to be used for an uplink (UL) multi-user (MU) transmission spans an overall frequency bandwidth greater than 160 MHz; and allocate one or more frequency RUs for the UL MU transmission, including: in response to determining that the communication channel spans the frequency bandwidth greater than 160 MHz, selecting one or more frequency RUs from the second set of frequency RUs. The one or more IC devices are further configured to: generate allocation information that indicates the allocation of the one or more frequency RUs for the UL MU transmission; and transmit the allocation information to one or more other communication devices in connection with the UL MU transmission.

Embodiment 13: The communication device of embodiment 12, wherein the one or more IC devices are further configured to: select one or more frequency RUs from a set of frequency RUs that omits all of the frequency RUs in the first subset of frequency RUs of the first set of frequency RUs.

Embodiment 14: The communication device of embodiment 13, wherein the one or more IC devices are further configured to: select one or more frequency RUs from a set of frequency RUs that does not include any RUs corresponding to 26 orthogonal frequency division multiplexing (OFDM) tones, and wherein the first set of frequency RUs includes multiple RUs corresponding to 26 OFDM tones.

Embodiment 15: The communication device of either of embodiments 13 or 14, wherein the one or more IC devices are further configured to: select one or more frequency RUs from a set of frequency RUs that does not include any RUs corresponding to 52 orthogonal frequency division multiplexing (OFDM) tones, and wherein the first set of frequency RUs includes multiple RUs corresponding to 52 OFDM tones.

Embodiment 16: The communication device of any of embodiments 12-15, wherein the one or more IC devices are further configured to: select one or more frequency RUs from a set of frequency RUs that includes one or more frequency RUs having one or more respective frequency bandwidths greater than 160 MHz.

Embodiment 17: The communication device of any of embodiments 12-16, wherein the one or more IC devices are further configured to: generate a trigger frame configured to prompt the one or more other communication devices to transmit as part of the UL MU transmission, including generating the trigger frame to include the allocation information; and transmit the allocation information in the trigger frame.

Embodiment 18: The communication device of embodiment 17, wherein the one or more IC devices are further configured to: generate a common information field of the trigger frame to include a bandwidth subfield that indicates the UL MU transmission is to have a bandwidth greater than 160 MHz; and generate one or more user information subfields of the trigger frame that correspond to the one or more other communication devices, where each user information subfield is generated to include i) a respective first subfield that includes an identifier of the respective other communication device, and ii) a respective RU allocation subfield that indicates a respective RU allocated to the respective other communication device.

Embodiment 19: The communication device of embodiment 18, wherein the one or more IC devices are further configured to, for each of the one or more respective RU allocation subfields: generate a first set of one or more bits of the RU allocation subfield that indicates a spectrum segment within the communication channel to be used for the UL MU transmission; and generate a second set of multiple bits of the RU allocation subfield that indicates the respective RU, within the spectrum segment indicated by the first set of one or more bits, allocated to the respective other communication device.

Embodiment 20: The communication device of embodiment 18, wherein the one or more IC devices are further configured to, for each of the one or more respective RU allocation subfields: generate a first set of multiple bits of the RU allocation subfield that indicates a starting frequency, within the communication channel to be used for the UL MU transmission, of the RU allocated to the respective other communication device; and generate a second set of multiple bits of the RU allocation subfield that indicates a frequency bandwidth of the respective RU allocated to the respective other communication device.

Embodiment 21: The communication device of embodiment 20, wherein the one or more IC devices are further configured to, for each of the one or more respective RU allocation subfields: generate the first set of multiple bits of the RU allocation subfield to indicate the starting frequency to a granularity of 40 MHz.

Embodiment 22: The communication device of any of embodiments 18-21, wherein the one or more IC devices are further configured to, for each of the one or more respective RU allocation subfields: generate the respective RU allocation subfield to consist of eight bits.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for allocating frequency resources for an uplink (UL) multi-user (MU) communication in a wireless local area network (WLAN), wherein a communication protocol defines a first set of frequency resource units (RUs) of different bandwidths for use with communication channels spanning at most 160 MHz and a second set of frequency RUs for use with communication channels spanning more than 160 MHz, wherein the first set of frequency RUs includes at least a first subset of frequency RUs having a first bandwidth and a second subset of RUs having a second bandwidth greater than the first bandwidth, and wherein the second set of frequency RUs omits at least some of the frequency RUs in the first subset of frequency RUs of the first set of frequency RUs, the method comprising:
determining, at a communication device, that a communication channel to be used for an UL MU transmission spans a frequency bandwidth greater than 160 MHz;
allocating, at the communication device, one or more frequency RUs for the UL MU transmission, including:
in response to determining that the communication channel spans the frequency bandwidth greater than 160 MHz, selecting one or more frequency RUs from the second set of frequency RUs;
generating, at the communication device, allocation information that indicates the allocation of the one or more frequency RUs for the UL MU transmission; and
transmitting, by the communication device, the allocation information to one or more other communication devices in connection with the UL MU transmission.

2. The method of claim 1, wherein selecting one or more frequency RUs from the second set of frequency RUs comprises selecting one or more frequency RUs from a set of frequency RUs that omits all of the frequency RUs in the first subset of frequency RUs of the first set of frequency RUs.

3. The method of claim 2, wherein selecting one or more frequency RUs from the second set of frequency RUs comprises selecting one or more frequency RUs from a set of frequency RUs that does not include any RUs corresponding to 26 orthogonal frequency division multiplexing (OFDM) tones, and wherein the first set of frequency RUs includes multiple RUs corresponding to 26 OFDM tones.

4. The method of claim 1, wherein selecting one or more frequency RUs from the second set of frequency RUs comprises selecting one or more frequency RUs from a set of frequency RUs that includes one or more frequency RUs having one or more respective frequency bandwidths greater than 160 MHz.

5. The method of claim 1, further comprising:
generating, at the communication device, a trigger frame configured to prompt the one or more other communication devices to transmit as part of the UL MU transmission, including generating the trigger frame to include the allocation information;
wherein transmitting the allocation comprises transmitting the allocation information in the trigger frame.

6. The method of claim 5, wherein generating the trigger frame comprises:
generating, at the communication device, a common information field to include a bandwidth subfield that indicates the UL MU transmission is to have a bandwidth greater than 160 MHz; and
generating, at the communication device, one or more user information subfields corresponding to the one or more other communication devices, where each user information subfield is generated to include i) a respective first subfield that includes an identifier of the respective other communication device, and ii) a respective RU allocation subfield that indicates a respective RU allocated to the respective other communication device.

7. The method of claim 6, wherein generating the respective RU allocation subfield comprises:
generating, at the communication device, a first set of one or more bits of the RU allocation subfield that indicates a spectrum segment within the communication channel to be used for the UL MU transmission; and
generating, at the communication device, a second set of multiple bits of the RU allocation subfield that indicates the respective RU, within the spectrum segment indicated by the first set of one or more bits, allocated to the respective other communication device.

8. The method of claim 6, wherein generating the respective RU allocation subfield comprises:
generating, at the communication device, a first set of multiple bits of the RU allocation subfield that indicates a starting frequency, within the communication channel to be used for the UL MU transmission, of the RU allocated to the respective other communication device; and
generating, at the communication device, a second set of multiple bits of the RU allocation subfield that indicates a frequency bandwidth of the respective RU allocated to the respective other communication device.

9. The method of claim 8, wherein generating the first set of multiple bits of the RU allocation subfield comprises:
generating the first set of multiple bits of the RU allocation subfield to indicate the starting frequency to a granularity of 40 MHz.

10. The method of claim 6, wherein generating the respective RU allocation subfield comprises:
generating the respective RU allocation subfield to consist of eight bits.

11. A communication device configured to operate according to a communication protocol that defines a first set of frequency resource units (RUs) of different bandwidths for use with communication channels spanning at most 160 MHz and a second set of frequency RUs for use with communication channels spanning more than 160 MHz, wherein the first set of frequency RUs includes at least a first subset of frequency RUs having a first bandwidth and a second subset of RUs having a second bandwidth greater than the first bandwidth, and wherein the second set of frequency RUs omits at least some of the frequency RUs in the first subset of frequency RUs of the first set of frequency RUs, the communication device comprising:
a wireless network interface device having one or more integrated circuit (IC) devices configured to:
determine that a communication channel to be used for an uplink (UL) multi-user (MU) transmission spans an overall frequency bandwidth greater than 160 MHz, and
allocate one or more frequency RUs for the UL MU transmission, including: in response to determining that the communication channel spans the frequency bandwidth greater than 160 MHz, selecting one or more frequency RUs from the second set of frequency RUs;
wherein the one or more IC devices are further configured to:
generate allocation information that indicates the allocation of the one or more frequency RUs for the UL MU transmission, and
transmit the allocation information to one or more other communication devices in connection with the UL MU transmission.

12. The communication device of claim 11, wherein the one or more IC devices are further configured to:
select one or more frequency RUs from a set of frequency RUs that omits all of the frequency RUs in the first subset of frequency RUs of the first set of frequency RUs.

13. The communication device of claim 12, wherein the one or more IC devices are further configured to:
select one or more frequency RUs from a set of frequency RUs that does not include any RUs corresponding to 26 orthogonal frequency division multiplexing (OFDM) tones, and wherein the first set of frequency RUs includes multiple RUs corresponding to 26 OFDM tones.

14. The communication device of claim 11, wherein the one or more IC devices are further configured to:
select one or more frequency RUs from a set of frequency RUs that includes one or more frequency RUs having one or more respective frequency bandwidths greater than 160 MHz.

15. The communication device of claim 11, wherein the one or more IC devices are further configured to:
generate a trigger frame configured to prompt the one or more other communication devices to transmit as part of the UL MU transmission, including generating the trigger frame to include the allocation information; and
transmit the allocation information in the trigger frame.

16. The communication device of claim 15, wherein the one or more IC devices are further configured to:
generate a common information field of the trigger frame to include a bandwidth subfield that indicates the UL MU transmission is to have a bandwidth greater than 160 MHz; and
generate one or more user information subfields of the trigger frame that correspond to the one or more other communication devices, where each user information subfield is generated to include i) a respective first subfield that includes an identifier of the respective other communication device, and ii) a respective RU allocation subfield that indicates a respective RU allocated to the respective other communication device.

17. The communication device of claim 16, wherein the one or more IC devices are further configured to, for each of the one or more respective RU allocation subfields:
generate a first set of one or more bits of the RU allocation subfield that indicates a spectrum segment within the communication channel to be used for the UL MU transmission; and
generate a second set of multiple bits of the RU allocation subfield that indicates the respective RU, within the spectrum segment indicated by the first set of one or more bits, allocated to the respective other communication device.

18. The communication device of claim 16, wherein the one or more IC devices are further configured to, for each of the one or more respective RU allocation subfields:
generate a first set of multiple bits of the RU allocation subfield that indicates a starting frequency, within the communication channel to be used for the UL MU transmission, of the RU allocated to the respective other communication device; and
generate a second set of multiple bits of the RU allocation subfield that indicates a frequency bandwidth of the respective RU allocated to the respective other communication device.

19. The communication device of claim 18, wherein the one or more IC devices are further configured to, for each of the one or more respective RU allocation subfields:
generate the first set of multiple bits of the RU allocation subfield to indicate the starting frequency to a granularity of 40 MHz.

20. The communication device of claim 16, wherein the one or more IC devices are further configured to, for each of the one or more respective RU allocation subfields:
generate the respective RU allocation subfield to consist of eight bits.

* * * * *